(12) United States Patent
Kim et al.

(10) Patent No.: US 11,962,937 B2
(45) Date of Patent: *Apr. 16, 2024

(54) METHOD AND DEVICE OF SUPER RESOLUTION USING FEATURE MAP COMPRESSION

(71) Applicant: Korea Advanced Institute of Science and Technology, Daejeon (KR)

(72) Inventors: Mun Churl Kim, Daejeon (KR); Yong Woo Kim, Daejeon (KR); Jae Seok Choi, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/088,645

(22) Filed: Dec. 26, 2022

(65) Prior Publication Data

US 2023/0216986 A1    Jul. 6, 2023

Related U.S. Application Data

(63) Continuation of application No. 16/960,088, filed as application No. PCT/KR2018/015735 on Dec. 12, 2018.

(30) Foreign Application Priority Data

Jan. 16, 2018  (KR) .................. 10-2018-0005783
Aug. 6, 2018   (KR) .................. 10-2018-0091484

(51) Int. Cl.
*H04N 7/01*    (2006.01)
*G06N 3/08*    (2023.01)
(Continued)

(52) U.S. Cl.
CPC ............. *H04N 7/0117* (2013.01); *G06N 3/08* (2013.01); *G06T 1/20* (2013.01); *G06T 3/40* (2013.01);
(Continued)

(58) Field of Classification Search
CPC ...... H04N 7/0117; H04N 19/124; G06N 3/08; G06N 3/04; G06N 3/045; G06N 3/048;
(Continued)

(56) References Cited

U.S. PATENT DOCUMENTS 5,838,299 A    11/1998  Smith et al.
6,563,544 B1    5/2003  Vasquez
(Continued)

FOREIGN PATENT DOCUMENTS

KR    10-2006-0077196    7/2006
KR       2006-0077196    7/2006
(Continued)

OTHER PUBLICATIONS

International Search Report and the Written Opinion dated Mar. 15, 2019 From the International Searching Authority Re. Application No. PCT/KR2018/015735 and Its Translation of Search Report Into English. (11 Pages).
(Continued)

*Primary Examiner* — Neil R McLean

(57) ABSTRACT

Disclosed are an image processing method and device using a line-wise operation. The image processing device, according to one embodiment, comprises: a receiver for receiving an image; a first convolution operator for generating a feature map by performing a convolution operation on the basis of the image; and a compressor for compressing the feature map into units of at least one line; and a decompressor for reconstructing the feature map compressed into units of lines.

20 Claims, 36 Drawing Sheets

(51) Int. Cl.
  *G06T 1/20* (2006.01)
  *G06T 3/40* (2006.01)
  *G06T 3/4007* (2024.01)
  *G06T 3/4046* (2024.01)
  *G06T 3/4053* (2024.01)
  *G06T 9/00* (2006.01)
  *H04N 19/124* (2014.01)
  *G06N 3/04* (2023.01)

(52) U.S. Cl.
  CPC .......... *G06T 3/4007* (2013.01); *G06T 3/4046* (2013.01); *G06T 3/4053* (2013.01); *G06T 9/00* (2013.01); *H04N 19/124* (2014.11); *G06N 3/04* (2013.01)

(58) Field of Classification Search
  CPC ....... G06T 1/20; G06T 3/4007; G06T 3/4046; G06T 3/4053; G09G 2320/0271; G09G 5/005; G09G 5/026
  USPC .................................................. 382/155, 232
  See application file for complete search history.

(56) References Cited

U.S. PATENT DOCUMENTS

| | | | |
|---|---|---|---|
| 10,394,929 B2 | 8/2019 | Tsai et al. | |
| 10,411,709 B1 | 9/2019 | Ghasemi et al. | |
| 10,521,696 B2 | 12/2019 | Yang | |
| 10,614,354 B2 | 4/2020 | Aydonat et al. | |
| 10,664,310 B2 | 5/2020 | Bokhari et al. | |
| 10,726,583 B2 | 7/2020 | Singh et al. | |
| 10,733,767 B2 | 8/2020 | Cho et al. | |
| 10,824,939 B2 | 11/2020 | Fang et al. | |
| 10,909,418 B2 | 2/2021 | Lee et al. | |
| 10,936,907 B2 | 3/2021 | Suresh et al. | |
| 11,057,585 B2 | 7/2021 | Kim et al. | |
| 2006/0215929 A1* | 9/2006 | Fresneau ................. | G06F 17/15 382/279 |
| 2013/0083844 A1 | 4/2013 | Chong et al. | |
| 2013/0100146 A1* | 4/2013 | Rao ........................ | H04N 19/85 345/506 |
| 2013/0100147 A1 | 4/2013 | Rao et al. | |
| 2018/0350110 A1 | 12/2018 | Cho et al. | |
| 2019/0073553 A1 | 3/2019 | Yao et al. | |
| 2020/0336699 A1 | 10/2020 | Kim et al. | |
| 2021/0065334 A1 | 3/2021 | Kim et al. | |
| 2021/0082087 A1 | 3/2021 | Kim et al. | |
| 2021/0192315 A1 | 6/2021 | Son et al. | |
| 2021/0366081 A1 | 11/2021 | Kim | |
| 2023/0276023 A1 | 8/2023 | Kim et al. | |

FOREIGN PATENT DOCUMENTS

| | | |
|---|---|---|
| KR | 10-2014-0072097 | 6/2014 |
| KR | 2014-0072097 | 6/2014 |
| KR | 10-2016-0015799 | 2/2016 |
| KR | 10-1677242 | 11/2016 |
| KR | 10-2017-0059040 | 5/2017 |
| KR | 2017-0059040 | 5/2017 |
| KR | 10-2018-0001428 | 1/2018 |
| KR | 2018-0001428 | 1/2018 |
| WO | WO 2019/143024 | 7/2019 |
| WO | WO 2019/143026 | 7/2019 |
| WO | WO 2019/143027 | 7/2019 |

OTHER PUBLICATIONS

International Search Report and the Written Opinion dated Mar. 15, 2019 From the International Searching Authority Re. Application No. PCT/KR2018/015736 and Its Translation of Search Report Into English. (12 Pages).
International Search Report and the Written Opinion dated Mar. 18, 2019 From the International Searching Authority Re. Application No. PCT/KR2018/015733 and Its Translation of Search Report Into English. (12 Pages).
Notice of Allowance dated Mar. 14, 2022 from US Patent and Trademark Office Re. U.S. Appl. No. 16/961,688. (6 pages).
Notice of Allowance dated Apr. 16, 2021 from the US Patent and Trademark Office Re. U.S. Appl. No. 16/960,917. (8 pages).
Official Action dated Dec. 24, 2020 from the US Patent and Trademark Office Re. U.S. Appl. No. 16/960,917. (7 pages).
Official Action dated Nov. 24, 2021 from US Patent and Trademark Office Re. U.S. Appl. No. 16/961,688. (23 pages).
Chang et al. "An Energy-Efficient FPGA-Based Deconvolutional Neural Networks Accelerator for Single Image Super-Resolution", IEEE Transactions on Circuits and Systems for Video Technology, 3091): 281-295, Published Online Dec. 20, 2018.
Chang et al. "An Energy-Efficient FPGA-Based Deconvolutional Neural Networks Accelerator for Single Image Super-Resolution", IEEE Transactions on Circuits and Systems for Video Technology, 30(1): 281-295 , Dec. 20, 2018.
Chang et al. "An Energy-Efficient FPGA-Based Deconvolutional Neural Networks Accelerator for Single Image Super-Resolution", IEEE Transactions on Circuits and Systems for Video Technology, 30(1): 281-295, Published Online Dec. 20, 2018.
Chang et al. "ECA: Energy-Efficient FPGA-based Convolutional Neural Networks Architecture for Single Image Super-Resolution", Computer Science, 14.P, 2018.
Chang et al. "ECA: Energy-Efficient FPGA-Based Convolutional Neural Networks Architecture for Single Image Super-Resolution", Computer Science, p. 1-14, Jan. 18, 2018.
Chang et al. "ECA: Energy-Efficient FPGA-Based Convolutional Neural Networks Architecture for Single Image Super-Resolution", Computer Science, p. 1-14, Jan. 18, 2018.
Chang et al. "On-Chip CNN Accelerator for Image Super-Resolution", Computing Research Repository, CoRR, 7 P., Jan. 18, 2018.
Chang et al. "On-Chip CNN Accelerator for Image Super-Resolution", CoRR, 7 P., 2018.
Chang et al. "On-Chip CNN Accelerator for Image Super-Resolution", Dept. of Electronic Engineering, Sogang University, Seoul, South Korea, 7P., Jan. 2018.
Chao et al. "Image Super-Resolution Using Deep Convolutional Networks", IEEE Transactions on Pattern Analysis and Machine ntelligence, 38(2): 295-307, Jun. 1, 2015.
Dong et al. "Accelerating the Super-Resolution Convolutional Neural Network", ArXiv Preprint ArXiv: 1608.00367.v1, p. 1-17, Aug. 1, 2016.
Dong et al. "Accelerating the Super-Resolution Convolutional Neural Network", European Conference on Computer Vision, ECCV: 391-407, Sep. 17, 2016.
Dong et al. "Accelerating the Super-Resolution Convolutional Neural-Network", Computer Vision and Pattern Recognition, arXiv Preprint arXiv:1608.00367v1, p. 1-17, Aug. 1, 2016.
Dong et al. "Image Super-Resolution Using Deep Convolution Networks", arXiv Preprint arXiv: 1501.00092v3, Jul. 31, 2015.
Dong et al. "Image Super-Resolution Using Deep Convolutional Networks", ArXiv Preprint ArXiv: 1501.00092.v3, p. 1-14, Jul. 31, 2015.
Kim et al. "2X Super-Resolution Hardware Using Edge-Orientation-Based Linear Mapping for Real-Time 4K UHD 60 fps Video Applications", IEEE Transactions on Circuits and Systems II: Express Briefs, 65(9): 1274-1278, , Jan. 30, 2018.
Kim et al. "2X Super-Resolution Hardware Using Edge-Orientation-Based Linear Mapping for Real-Time 4K UHD 60 Fps Video Applications", IEEE Transactions on Circuits and Systems II: Express Briefs, 65(9): 1274-1278, Published Online Jan. 30, 2018. Abstract.
Kim et al. "A Real-Time 2X Super-Resolution Using Convolutional Neural Networks Without Frame Buffer on FPGA for 4K UHD 60 FPS Video Applications", IEEE Transactions on Circuits and Systems for Video Technology, 29(8): 2521-2534, Aug. 8, 2018.
Kim et al. "A Real-Time Convolutional Neural Network for Super-Resolution on FPGA With Applications to 4 K UHD 60 Fps Video

(56) References Cited

OTHER PUBLICATIONS

Services", IEEE Transactions on Circuits and Systems for Video Technology, 29(8): 2521-2534, Aug. 8, 2019.

Kim et al. "A Real-Time Convolutional Neural Network for Super-Resolution on FPGA with Applications to 4K UHD 60 fps Video Services", IEEE Transactions on Circuits and Systems for Video Technology, 29(8): 2521-2534, Aug. 8, 2018.

Kim et al. "A Real-Time Convolutional Neural Network for Super-Resolution on FPGA With Applications to 4K UHD 60 fps Video Services", IEEE Transactions on Circuits and Systems for Video Technology, 29(8): 2521-2534, Aug. 2019.

Kim et al. "Accurate Image Super-Resolution Using Very Deep Convolutional Networks", 2016 IEEE Conference on Computer Vision and Pattern Recognition, CVPR '16, Las Vegas, NV, USA, Jun. 27-30, 2016, p. 1646-1653, Jun. 27, 2016.

Kim et al. "Accurate Image Super-Resolution Using Very Deep Convolutional Networks", 2016 IEEE Conference on Computer Vision and Pattern Recognition, CVPR'16, Las Vegas, NV, USA, Jun. 27-30, 2016, p. 1646-1654, Jun. 27, 2016.

Kim et al. "Accurate Image Super-Resolution Using Very Deep Convolutional Networks",The IEEE Conference on Computer Vision and Pattern Recognition (CVPR): 1646-1654, 2016.

Larson "Pointwise Convolutions and Dimensionality Reduction", Deep Learning, 1 P., Aug. 2017.

Prove "An Introduction to Different Types of Convolutions in Deep Learning", Towards Data Science, 1 P., Jul. 23, 2017.

Prove "An Introduction to Different Types of Convolutions in Deep Learning", Towards Data Science, 8.P., Jul. 22, 2017.

Shi et al. "Real-Time Single Image and Video Super-Resolution Using An Efficient Sub-Pixel Convolutional Neural Network", Proceedings of the 2016 IEEE Conference on Computer Vision and Pattern Recognition, CVPR '16, Las Vegas, NV, USA, Jun. 27-30, 2016, p. 1874-1883, Jun. 27, 2016.

Shi et al. "Real-Time Single Image and Video Super-Resolution Using an Efficient Sub-Pixel Convolutional Neural Network", The 2016 IEEE Conference on Computer Vision and Pattern Recognition, CVPR '16, Las Vegas, NV, USA, Jun. 27-30, 2016, p. 1874-1883, Jun. 27, 2016.

Shi et al. "Real-Time Single Image and Video Super-Resolution Using an Efficient Sub-Pixel Convolutional Neural Network", The IEEE Conference on Computer Vision and Pattern Recognition (CVPR): 1874-1883, 2016.

Telarson Pointwise Convolutions and Dimensionality Reduction:, Deep Learning, 2.P., Aug. 2017.

Official Action dated Sep. 1, 2023 from the US Patent and Trademark Office Re. U.S. Appl. No. 16/960,088. (24 pages).

Official Action dated Aug. 2, 2023 from the US Patent and Trademark Office Re. U.S. Appl. No. 16/960,907. (23 pages).

Official Action dated Aug. 2, 2023 from the US Patent and Trademark Office Re. U.S. Appl. No. 18/088,646. (19 pages).

Notice of Allowance Dated Dec. 4, 2023 together with Interview Summary Dated Dec. 4, 2023 from the U.S. Patent and Trademark Office Re. U.S. Appl. No. 16/960,907. (11 pages).

Notice of Allowance Dated Dec. 6, 2023 together with Interview Summary Dated Nov. 16, 2023 from the U.S. Patent and Trademark Office Re. U.S. Appl. No. 18/088,646. (13 pages).

Notice of Allowance Dated Dec. 15, 2023 From the U.S. Patent and Trademark Office Re. U.S. Appl. No. 16/960,088. (xx Pages).

* cited by examiner

Algorithm 1: Feature map compression algorithm of compressor

1. Input: Feature Map Data in a line.
2. Initialization:
   Generate 1×32 block from feature map data in a line
3. For each 1x32 block, do
4.     Compute max value, assign zero min value
   $1^{st}$ point = zero value
   $32^{th}$ point = max value
5.     Compute 30 intermediate points through interpolation
   $2^{nd}$ point = (1/32)*max value
   $3^{rd}$ point = (2/32)*max value
   ...
   $31^{th}$ point = (30/32)*max value
6.     For each feature map in 1x32 block, do
7.         Find index value by closest to reference colors.
8.     End For
9. End For
10. Store each max value and index values of 1x32 block in a line

FIG. 3b

METHOD AND DEVICE OF SUPER RESOLUTION USING FEATURE MAP COMPRESSION

RELATED APPLICATIONS

This application is a Continuation of U.S. patent application Ser. No. 16/960,088 filed on Jul. 6, 2020, which is a National Phase of PCT Patent Application No. PCT/KR2018/015735 having International filing date of Dec. 12, 2018, which claims the benefit of priority of Korean Patent Applications Nos. 10-2018-0005783 filed on Jan. 16, 2018, and 10-2018-0091484 filed on Aug. 6, 2018. The contents of the above applications are all incorporated by reference as if fully set forth herein in their entirety.

FIELD AND BACKGROUND OF THE INVENTION

Example embodiments relate to an image processing method and device using a line-wise operation.

Ultra-high-definition (UHD) videos are widely used for UHD television (TV) and Internet protocol TV (IPTV) services and smartphone applications. Although numerous advanced TVs and smartphones support 4K UHD videos, there are many video streams having a full high-definition (FHD) with a resolution of 1920×1080 due to legacy acquisition devices and services.

Thus, there needs an accurate upscaling method to convert a low-resolution (LR) content to a high-resolution (HR) one. Such an accurate upscaling method may be more needed for video upscaling to convert 2K FHD to 4K UHD.

The upscaling method is classified into two types: one is a single image upscaling algorithm that uses a local spatial correlation in a single LR image to reconstruct lost high-frequency details; and the other one is a video upscaling algorithm that uses an additional data dimension or time to improve performance, and costs high for computation.

The single image upscaling algorithm is classified into an interpolation method and a super-resolution (SR) method. The interpolation method uses a simple interpolation kernel such as a bilinear or a bicubic kernel.

The SR method may have improved performance compared to the preceding interpolation method. A fundamental concept of a learning-based approach may be to learn a mapping function from an LR image or video to an HR image or video. The learning-based approach is classified into the following two types.

One is to learn LR-HR mapping by using surrounding information of an LR image, which is based on internal information of an input image. The other one is to perform learning by using an external LR-HR image pair, which is based on external learning or training image, or on a dictionary.

For the SR method, machine learning algorithms such as sparse coding, an anchored neighbor, and a linear mapping kernel have been suggested.

However, such learning-based SR algorithm may need a frame buffer of a great capacity to store intermediate images. Thus, it may not be easy to implement the SR method to convert an HR image to an SR image, for example, an 2K FHD to a 4K UHD, in real time in low-complexity hardware (HW).

A recent suggestion, for example, a deep neural network (DNN), and particularly a convolution neural network (CNN), may exhibit great performance in various computer vision fields such as image classification, object detection, and object segmentation.

The machine learning-based method may discover features in a hand-crafted design and learn mappings using such hand-crafted features. In contrast, the DNN may learn itself optimal features and mappings and make overall learning simpler and more effective.

An accurate CNN-based SR method has been suggested to improve a visual quality of HR reconstruction. Such a CNN architecture may include a plurality of layers and nonlinear functions, and be designed to perform SR and generate HR images or high-quality videos.

It is believed that an existing CNN is difficult to be implemented in a low-complexity HW for a real-time application due to excessive multiplications and calculations. In addition, an analysis of a computational complexity and a runtime of the accurate CNN-based SR method is performed at a level of software (SW) of a platform of a central processing unit (CPU) and/or graphics processing unit (GPU). Further, such a CNN architecture may need to use a plurality of frame buffers to store intermediate feature maps when embodied by SW and HW, and thus it may not be easy to be implemented in real time.

SUMMARY OF THE INVENTION

Example embodiments provide a technology for processing an image using a line-wise operation.

According to an example embodiment, there is provided an image processing device including a receiver configured to receive an image, a first convolution operator configured to generate a feature map by performing a convolution operation based on the image, a compressor configured to compress the feature map into at least one line-wise feature map, and a decompressor configured to reconstruct the compressed line-wise feature map.

The image processing device may further include at least one first line buffer configured to output the image as a line-wise image line.

The image processing device may further include at least one second line buffer configured to store the compressed line-wise feature map.

The first convolution operator may be implemented in a residual block that learns a residual signal and outputs the learned residual signal.

The first convolution operator may include at least one one-dimensional (1D) convolution operator configured to perform an 1D convolution operation.

The first convolution operator may include a depth-wise convolution operator and a point-wise convolution operator connected directly to the depth-wise convolution operator.

The compressor may compress the feature map in at least one direction of a width direction, a height direction, or a depth direction of the feature map.

The image processing device may further include a second convolution operator configured to perform a convolution operation based on the reconstructed compressed feature map.

The second convolution operator may include at least one two-dimensional (2D) convolution operator configured to perform a 2D convolution operation.

The second convolution operator may include a depth-wise convolution operator and a point-wise convolution operator connected directly to the depth-wise convolution operator.

The image processing device may further include a quantizer configured to quantize a result of at least one convolution operation.

The image processing device may further include a weight buffer configured to store a parameter used for a convolution operation.

According to another example embodiment, there is provided an image processing method including receiving an image, generating a feature map by performing a first convolution operation based on the image, compressing the feature map into at least one line-wise feature map, and reconstructing the compressed line-wise feature map.

The image processing method may further include outputting the image as at least one line-wise image line.

The image processing method may further include storing the compressed line-wise feature map.

The first convolution operation may be performed in a residual block that learns a residual signal and outputs the learned residual signal.

The generating may include performing at least one 1D convolution operation.

The generating may include performing a depth-wise convolution operation and performing a point-wise convolution operation directly on a result of the depth-wise convolution operation.

The compressing may include compressing the feature map in at least one direction of a width direction, a height direction, or a depth direction of the feature map.

The image processing method may further include performing a second convolution operation based on the reconstructed compressed feature map.

The performing may include performing at least one 2D convolution operation.

The performing may include performing a depth-wise convolution operation and performing a point-wise convolution operation directly on a result of the depth-wise convolution operation.

The image processing method may further include quantizing a result of at least one convolution operation.

The image processing method may further include storing a parameter used for a convolution operation.

BRIEF DESCRIPTION OF THE SEVERAL VIEWS OF THE DRAWINGS

FIG. 3b illustrates an example of a compression algorithm of the compressor illustrated in FIG. 2.

DESCRIPTION OF SPECIFIC EMBODIMENTS OF THE INVENTION

Figure 1:
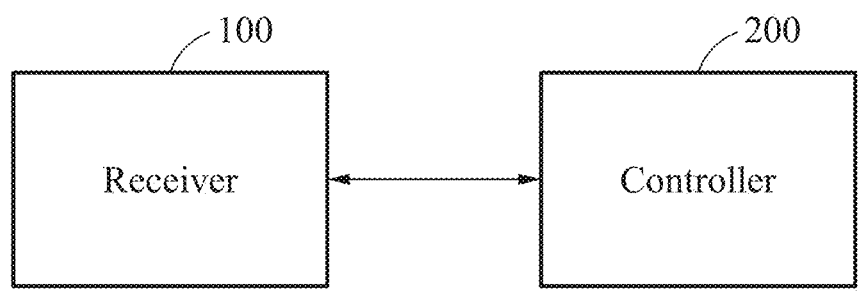
FIG. 1 is a block diagram illustrating an image processing device according to an example embodiment.

Hereinafter, example embodiments will be described in detail with reference to the accompanying drawings. However, various changes, modifications, and equivalents of the methods, apparatuses, and/or systems described herein will be apparent after an understanding of the present disclosure of this application. For example, the sequences of operations described herein are merely examples, and are not limited to those set forth herein, but may be changed as will be apparent after an understanding of the present disclosure, with the exception of operations necessarily occurring in a certain order.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In addition, regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The term "module" described herein may indicate hardware to perform a function and an operation of each component described herein, a computer program code to perform a certain function and operation, or an electronic recording medium, for example, a processor and a microprocessor, in which a computer program code used to perform a certain function and operation is provided.

That is, a module described herein may indicate hardware to perform technical ideas of the present disclosure, and/or a functional and/or structural combination with software to operate the hardware.

FIG. 1 is a block diagram illustrating an image processing device according to an example embodiment.

Referring to FIG. 1, an image processing device 10 may receive an image and process the received image. For example, the image processing device 10 may process the received image to generate a high-resolution (HR) image.

The image processing device 10 may effectively process the received image in low-specification hardware. The image processing device 10 may train a neural network based on the received image.

The image processing device 10 may increase a resolution of the image using the trained neural network. For example, the image processing device 10 may perform super resolution (SR) on a low-resolution (LR) image.

The image processing device 10 may provide a hardware-friendly convolutional neural network (CNN)-based SR method. The image processing device 10 may be embodied in a field programmable gate array (FPGA) to convert a 2K full high-definition (FHD) image to a 4K ultra-high-definition (UHD) one at 60 frames per second (fps).

The image processing device 10 may effectively perform the SR using a neural network in hardware having a limited computation and memory space. The image processing device 10 may process an LR input line-wise, and maintain a parameter value of a convolution filter at a small number. That is, the image processing device 10 may process LR data line-wise, and thus significantly reduce the number of filter parameters compared to an existing CNN.

The image processing device 10 may process an SR image using a cascade of a one-dimensional (1D) convolution. The image processing device 10 may thus save a required line memory by maintaining a large receptive field along a horizontal line while maintaining a vertical receptive field at a small size. Herein, a line memory may include a line buffer.

The image processing device 10 may reduce the number of filter parameters of the neural network by combining a residual connection and a depth-wise separable convolution (DSC), and maintain improved SR performance with a reduced quantity of computations or operations.

The image processing device 10 may convert 32-bit floating-point data to fixed-point data without a degradation of a peak signal-to-noise ratio (PSNR), through quantization. In addition, the image processing device 10 may compress a feature map to reduce a line memory needed to store feature map data.

The image processing device 10 includes a receiver 100 and a controller 200.

The receiver 100 may receive an image. The image received by the receiver 100 may indicate an image of an object formed by refraction or reflection of light. The image may include, for example, a video, a picture, a photograph, and the like.

The receiver 100 may receive the image in a form of pixel information. For example, the receiver 100 may receive two-dimensional (2D) pixel information.

The image may include an LR image and an HR image.

The controller 200 may process the received image. The controller 200 may increase a resolution of the received image. The controller 200 may perform the SR on the received image.

The controller 200 may process the image line-wise. The controller 200 may output the image line-wise and perform a line-wise operation to increase a resolution of the image.

Figure 2:
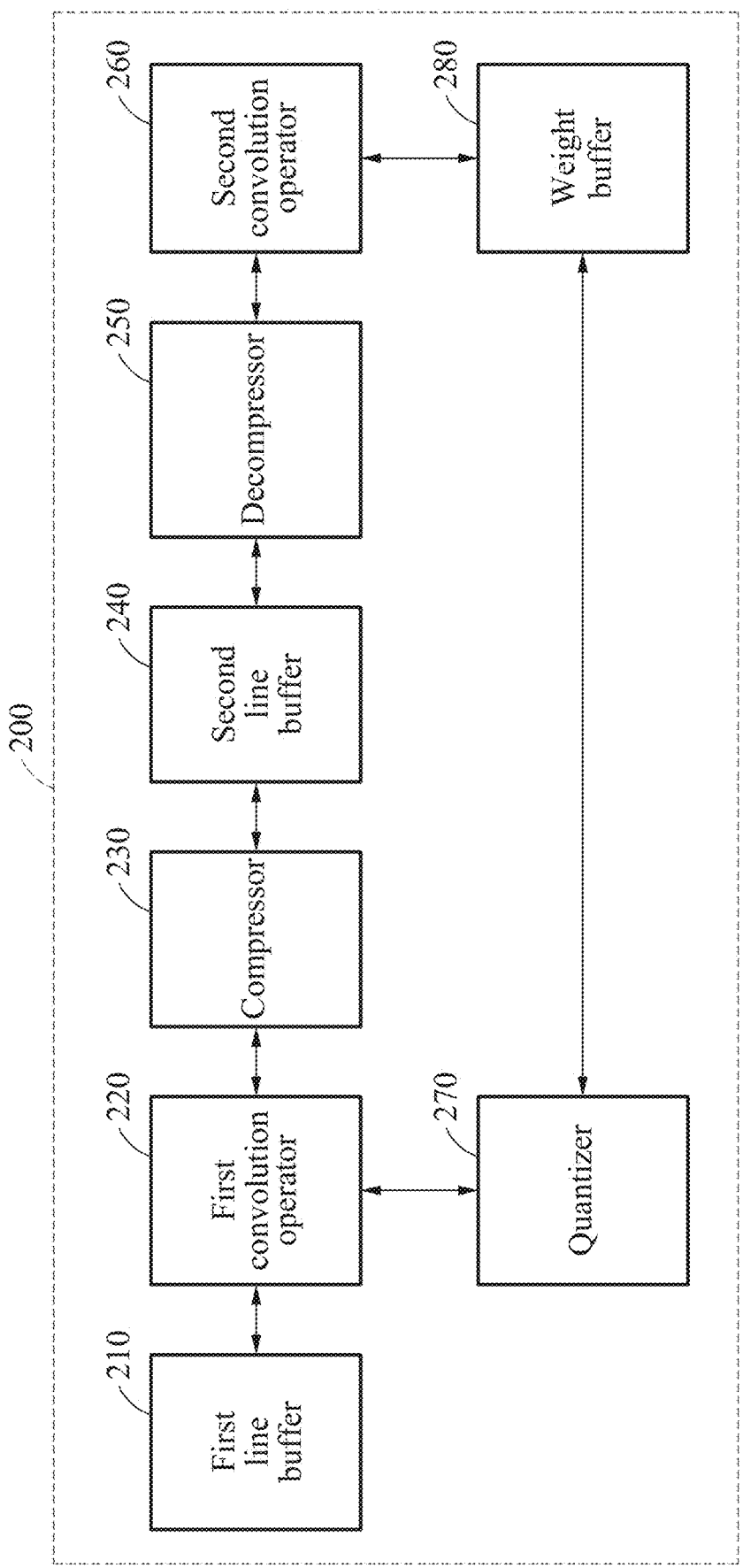
FIG. 2 is a block diagram illustrating a controller illustrated in FIG. 1.

FIG. 2 is a block diagram illustrating the controller illustrated in FIG. 1.

Referring to FIG. 2, the controller 200 includes a first line buffer 210, a first convolution operator 220, and a compressor 230. The controller 200 also includes a second line buffer 240, a decompressor 250, and a second convolution operator 260. In addition, the controller 200 further includes a quantizer 270 and a weight buffer 280.

The first line buffer 210 may output an image as a line-wise image line. The first line buffer 210 may include one or more line buffers. Here, the number of the line buffers may be determined based on a size of a convolution filter.

The first convolution operator 220 may generate a feature map by performing a convolution operation based on the image line.

The compressor 230 may compress the feature map into at least one line-wise feature map. The compressor 230 may compress the feature map in at least one direction of a width direction, a height direction, or a depth direction of the feature map.

The second line buffer 240 may store the compressed line-wise feature map. The second line buffer 240 may include one or more line buffers. Here, the number of the line buffers may be determined based on a size of a convolution filter used to perform a convolution operation.

The decompressor 250 may reconstruct the compressed line-wise feature map to a two-dimensional (2D) feature map. Operations of the compressor 230 and the decompressor 250 will be described in detail with reference to FIGS. 3a and 3b.

The second convolution operator 260 may perform a convolution operation based on the 2D feature map.

The quantizer 270 may quantize a result of at least one convolution operation. The quantizer 270 may quantize convolution results and filter parameters using various quantization methods.

The quantization methods of the quantizer 270 may include all quantization algorithms that convert a floating point to a fixed point, for example, a uniform quantization and a non-uniform quantization. For example, the quantizer 270 may quantize the convolution results and the filter parameters through the uniform quantization.

The image processing device 10 may use a fixed-point representation through the quantizer 270 to reduce complexity. The quantizer 270 may convert floating-point data to fixed-point data.

The fixed-point data may be defined as [IL, FL] to represent respective numerical values, in which IL denotes an integer length and FL denotes a fraction length. The quantizer 270 may calculate a total bit number used to represent a numeral by adding an integer bit number and a fraction bit number.

A sum of these, or IL+FL, may be represented by a WL which denotes a word length. The quantizer 270 may limit a level of data precision to an FL bit through a fixed-point form in [IL, FL], and set a range to be $[-2^{IL-1}, 2^{IL-1}-2^{-FL}]$.

When converting a floating point to a fixed point, the quantizer 270 may use a round-off method that rounds off to the nearest. Such round-off method may be represented by Equation 1.

$$\text{Round } (x, [IL, FL]) = \begin{cases} \lfloor x \rfloor & \text{if } \lfloor x \rfloor \leq x \leq \lfloor x \rfloor + \frac{\varepsilon}{2} \\ \lfloor x \rfloor + \varepsilon & \text{if } \lfloor x \rfloor + \frac{\varepsilon}{2} \leq x \leq \lfloor x \rfloor + \varepsilon \end{cases}$$

[Equation 1]

In Equation 1, $\lfloor x \rfloor$ is defined as a greatest integer multiple of $\varepsilon (=2^{-FL})$, which is less than or equal to x. If x is out of a range of [IL, FL], a result may be saturated to a lower or upper limit of [IL, FL]. A method of converting a floating point to a fixed point may also be represented by Equation 2.

$$\text{Convert } (x, [IL, FL]) = \begin{cases} -2^{IL-1} & , \text{if } x \leq -2^{IL-1} \\ 2^{IL-1} - 2^{-FL} & , \text{if } x \geq 2^{IL-1} - 2^{-FL} \\ \text{Round } (x, [IL, FL]), & \text{otherwise.} \end{cases}$$

[Equation 2]

To minimize a PSNR degradation of a test set of floating-point data (filter parameters and activation values) through numerous experiments, optimal WL, IL, and FL values may be applied to the image processing device 10. Here, a degradation by the quantization in a network used by the image processing device 10 may be extremely insignificant.

The weight buffer 280 may store a parameter used for a convolution operation.

The components described above may operate through a pipeline. For example, at least one convolution operation may operate through a pipeline.

Figure 3A:
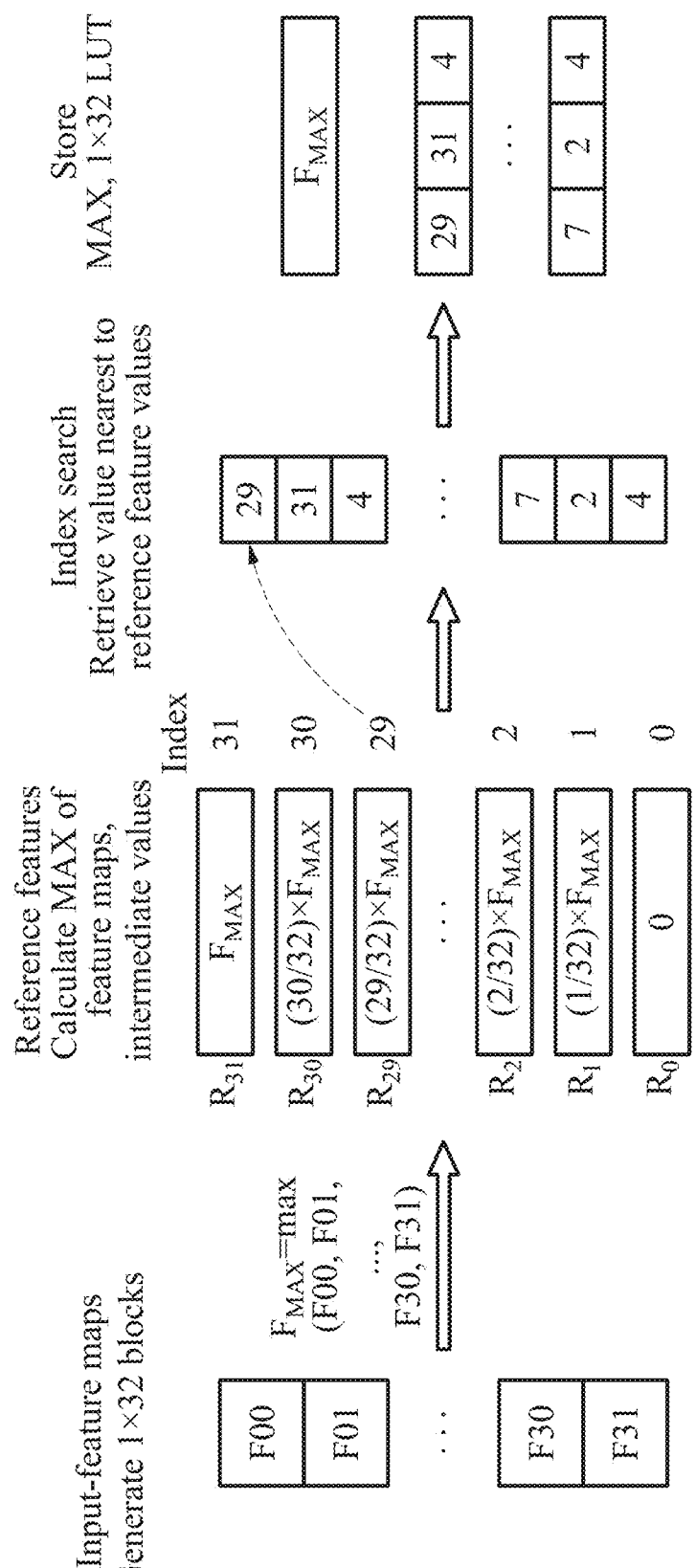
FIG. 3a illustrates an example of an operation of a compressor illustrated in FIG. 2.

FIG. 3a illustrates an example of an operation of the compressor illustrated in FIG. 2. FIG. 3b illustrates an example of a compression algorithm of the compressor illustrated in FIG. 2.

Referring to FIGS. 3a and 3b, the compressor 230 may compress a feature map through various compression algorithms. A compression algorithm may include fixed-length coding and variable-length coding. The fixed-length coding may include a S3 Texture Compression (S3TC) (sometimes also called DXT) algorithm, and a block-based algorithm such as joint photographic experts group (JPEG) and JPEG 2000. The fixed-length coding may be preferred in terms of hardware complexity.

The variable-length coding may include Huffman coding and arithmetic coding. The variable-length coding may be used to increase a compressibility.

In addition, the compressor 230 may compress the feature map using an algorithm modified from the algorithms described in the foregoing.

A size of a receptive field may greatly affect performance. In addition, both a horizontal receptive field and a vertical receptive field may be important. However, in a case of a 3×3 convolution including a vertical direction, feature map data may need to be stored in a line memory when data output after passing through a previous convolution layer is transmitted to a subsequent 3×3 convolution layer.

When passing through a 3×3 convolution layer, line memories that are twice as many as the number of line memories required to store output feature maps of a current layer may be needed.

However, using many line memories may result in issues in chip design. For example, the issues may include an increase in chip size due to an increase in the number of power rings used in the line memories, a routing congestion in place and route (P&R), and a voltage drop in case of a shortage of power rings in a memory block boundary.

To solve such issues described in the foregoing, there may need a method of reducing the number of line memories, and a feature map compression method may be considered.

The compressor 230 may use the feature map compression method based on various considerations in terms of hardware implementation. A feature map to be compressed by the compressor 230 may include an intermediate feature map.

The compressor 230 may use an extremely simple compression algorithm. Herein, compression may be used to reduce the number of line memories. Thus, a size of a logic used for the compression may need to be smaller than a size of a memory required to store an intermediate feature map before the compression.

Residual learning and use of a ReLU may cause many 0s and values near to 0 in feature maps, and thus the compressor 230 may provide an effective compression algorithm based on such a data characteristic. The compressor 230 may compress data, using only nearby data in a horizontal direction to effectively use a line memory.

For example, an algorithm used by the compressor 230 may include an algorithm modified from a DXT5 algorithm to be suitable for a CNN architecture. For example, when compressing RGB pixels of a 4×4 block, DXT5 may compress respective RGB color channel inputs, independently.

In this example, a maximum value (MAX) and a minimum value (MIN) of each color channel may be calculated. Thus, six intermediate points may be generated through interpolation using the calculated MAX and the MIN. The MAX and MIN values, and the six intermediate points may be defined as a reference value for the compression.

To encode pixel data, an index value of a color nearest to a reference color may be assigned to each pixel. The encoding may be completed by storing a 4×4 block index value, and the MAX and MIN values. There may be eight neighboring index values for each pixel in a 4×4 block, and each index may be represented by 3 bits for each pixel.

In addition, decoding may be readily performed using the MAX and MIN values, and the index value, in reverse order from that of the encoding. For example, when a bit per pixel (bpp) of an RGB input is 8 bits, DXT5 may have a set compression ratio (CR) of 2:1 for the 4×4 block.

The CR may be calculated as represented by Equation 3.

$$CR = \frac{\text{uncompressed bits}}{\text{compressed bits}} \qquad \text{[Equation 3]}$$
$$= \frac{bpp \times \text{block\_size}}{3 \times (\text{max} + \text{min} + \text{block\_size} \times \text{index})}$$

The compressor 230 of the image processing device 10 may provide a compression method that minimizes an image quality degradation and increases a CR by modifying the DXT5 algorithm. Differences between the existing DXT5 and the image processing device 10 are as indicated in Table 1 below.

TABLE 1

| Method | Existing DXT5 | Image processing device 10 |
|---|---|---|
| Input | RGB | Intermediate feature maps |
| Bits | 24 bits | 14 bits (quantized) |
| Block | 4 × 4 | 1 × 32 |
| Max value | Compute | Compute |
| Min value | Compute | 0 (fixed) |
| Bits per index | 3 | 5 |
| Divisor value | 7 | 32 (approximate) |
| Compression ratio | 2:1 | 2.58:1 |

The compressor 230 may calculate only the maximum value with the minimum value being set as 0. By setting the minimum value as 0, the compressor 230 may use a characteristic of data of intermediate feature maps being 0 or a value near to 0.

By setting the minimum value as 0, the image processing device 10 may reduce bits to store the minimum value, and remove a logic to calculate the minimum value. Since the data of the intermediate feature maps needs to be processed line-wise in hardware, a block size of the data of the feature maps may be set to be 1×32.

In addition, a 5-bit index may be assigned, as a quantization level, to each set of data in the 1×32 block of the feature maps. A single index of the data may be assigned to maintain an image quality. A 5-bit length for indices may be experimentally determined by verifying a PSNR performance based on a bit length for data point indices.

A CR of the compressor 230 may be represented by Equation 4.

$$PCR = \frac{\text{bits of quantized feature map} \times \text{block\_size}}{(\text{bits of max} + \text{block\_size} \times \text{bits of index})} \qquad \text{[Equation 4]}$$

For example, when a word length (WL) of feature map data after quantization of an activation is a 14-bit depth, the CR may be 2.58:1(=14(1×32)/(14+5(1×32))). That is, the number of line memories to store feature maps may be reduced to approximately 2.58 times.

As indicated in Table 1, the compressor 230 may set a divisor value to be 32, which is a multiple of 2, in lieu of 31($2^5$−1), to reduce hardware complexity in calculating intermediate points. Thus, the compressor 230 may calculate intermediate points by shift and add operators.

Figure 4:
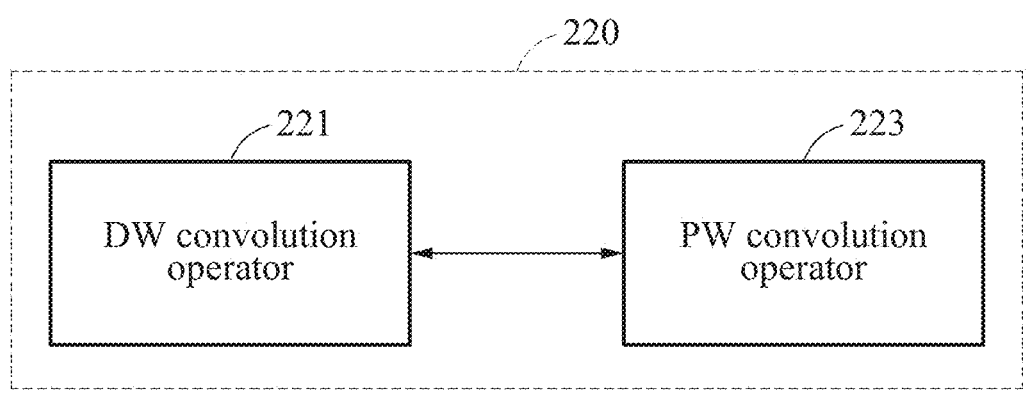
FIG. 4 is a block diagram illustrating a first convolution operator illustrated in FIG. 2.

FIG. 4 is a block diagram illustrating the first convolution operator illustrated in FIG. 2.

Referring to FIG. 4, the first convolution operator 220 may be implemented in a residual block that learns a residual signal and outputs the learned residual signal. The first convolution operator 220 may include at least one 1D convolution operator configured to perform a 1D convolution operation.

The 1D convolution operation may indicate a convolution operation using line-wise data as an input. For example, the 1D convolution operation may indicate a 1×n convolution. In this example, n, which denotes a length of the line-wise data, may have an arbitrary integer value greater than or equal to 2.

The first convolution operator 220 includes a depth-wise (DW) convolution operator 221, and a point-wise (PW) convolution operator 223 connected directly to the DW convolution operator 221.

The DW convolution operator 221 may perform a convolution operation in a depth direction of a feature map. The DW convolution operator 221 may perform a DW convolution operation one or more times. The PW convolution operator 223 may perform a convolution operation for each point. The PW convolution operator 223 may perform a PW convolution operation one or more times.

The DW convolution operator 221 may include at least one 1D convolution operator. The PW convolution operator 223 may perform a 1×1 convolution.

Figure 5A:
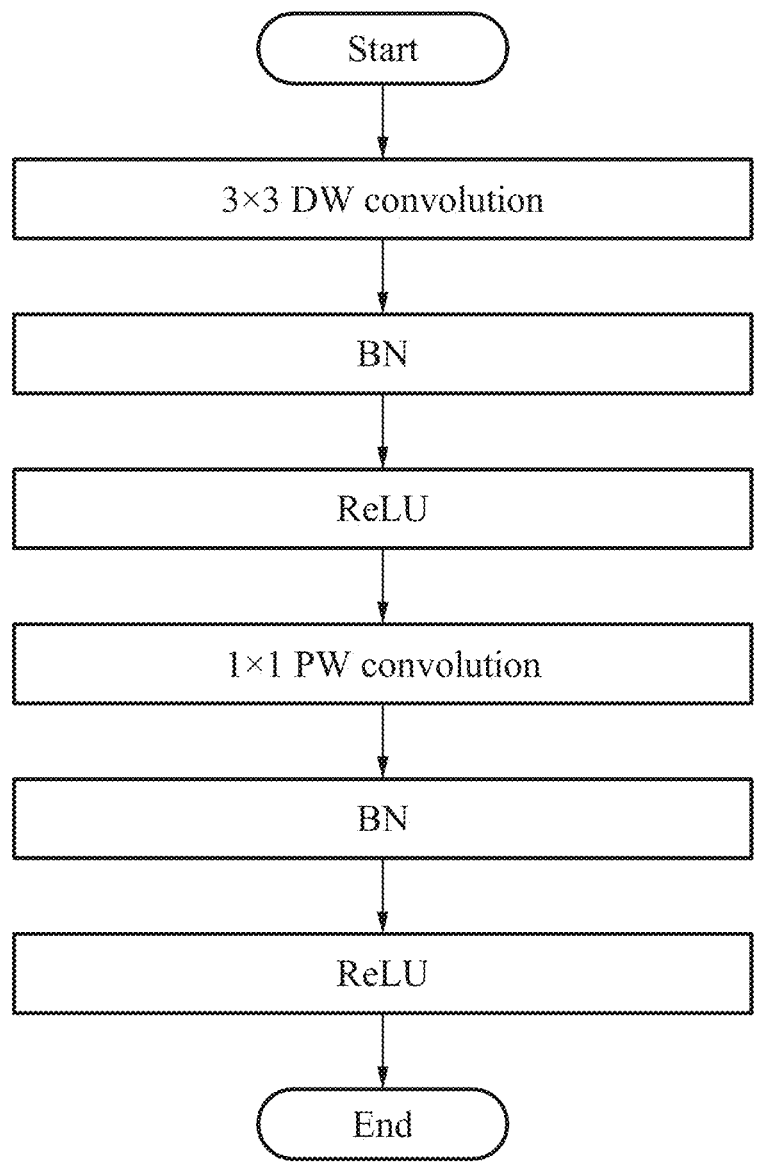
FIG. 5a illustrates an example of an existing depth-wise separable convolution (DSC).
Figure 5B:
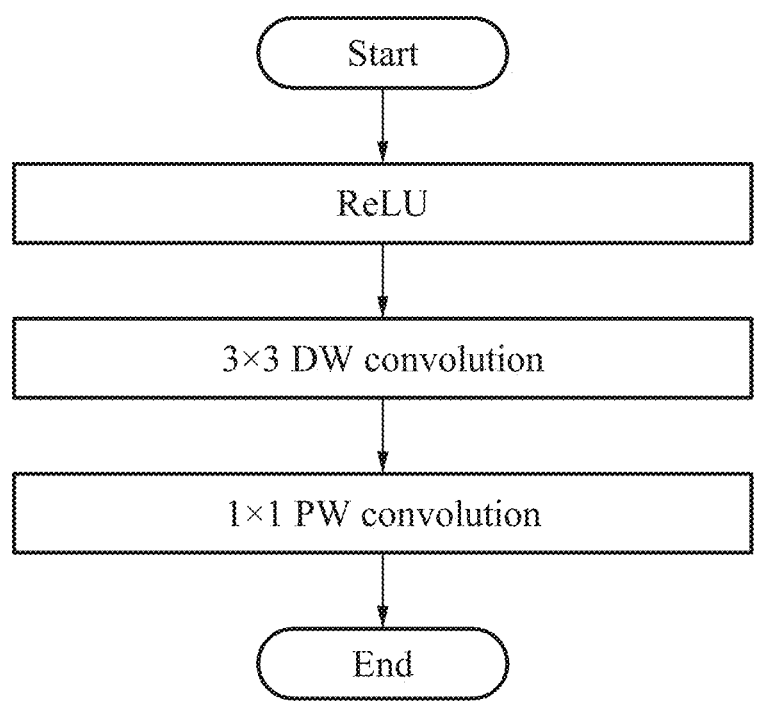
FIG. 5b illustrates an example of an operation of the first convolution operator illustrated in FIG. 2.
Figure 5C:
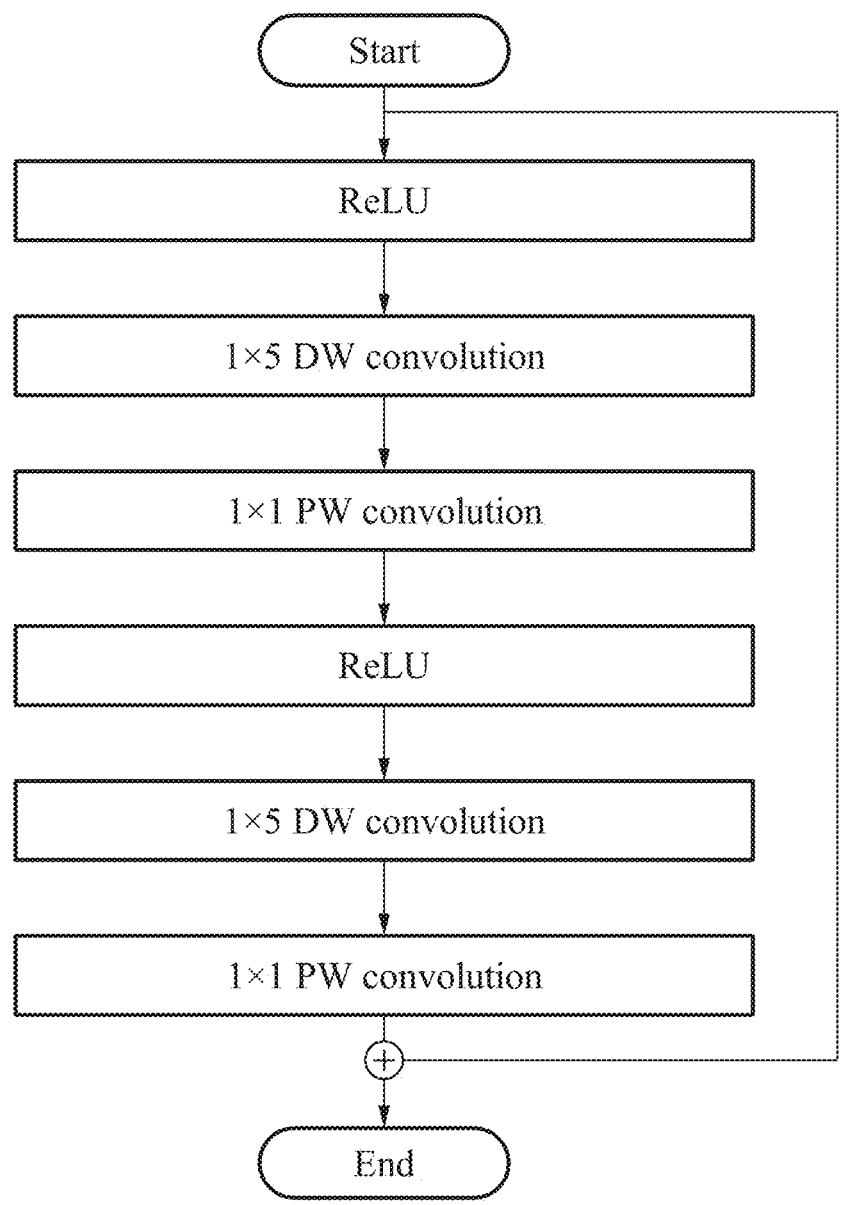
FIG. 5c illustrates another example of an operation of the first convolution operator illustrated in FIG. 2.

FIG. 5a illustrates an example of an existing DSC. FIG. 5b illustrates an example of an operation of the first convolution operator illustrated in FIG. 2. FIG. 5c illustrates another example of an operation of the first convolution operator illustrated in FIG. 2.

Referring to FIGS. 5a through 5c, the first convolution operator 220 may use a DSC to perform a convolution operation. Through this, the first convolution operator 220 may achieve a similar classification performance only with the number of parameters that is approximately ⅑ of that of an existing non-separable convolution.

The DSC may include a DW convolution operation, a rectified linear unit (ReLU), and a PW convolution operation that are connected in cascade.

However, the DSC may have a relatively low performance when being used in regression as in SR. A batch normalization (BN) may require a relatively high operation or computation quantity to calculate a mean and a variance, while degrading a performance in a regression analysis.

Thus, the first convolution operator 220 may use an architecture in which the BN and the ReLU are removed from the DSC. For example, the first convolution operator 220 may remove the ReLU between the DW convolution operator 221 and the PW convolution operator 223, and use them through a direct connection therebetween.

When a lower number of convolution filters is used along with the ReLU in the DSC, feature maps passing through the ReLU may become extremely sparse. This may obstruct learning and result in a lower PSNR performance.

FIG. 5a illustrates an existing DSC architecture, and FIG. 5b illustrates an architecture of a convolution layer used by the first convolution operator 220. A result of comparing PSNR and structural similarity (SSIM) performances for a dataset, Set-5, when there is the ReLU between the DW convolution operator 221 and the PW convolution operator 223 and when there is not the ReLU between the DW convolution operator 221 and the PW convolution operator 223, is as illustrated in Table 2 below.

TABLE 2

|  | Mean PSNR | Mean SSIM |
| --- | --- | --- |
| ReLU present | 33.54 dB | 0.9544 |
| ReLU absent | 33.66 dB | 0.9548 |
| Difference | +0.12 dB | +0.0004 |

In the existing DSC, a 3×3 size filter may be used for a DW convolution. However, some display applications such as T-Con may not excessively use a line memory, and thus there may be a restriction on using such a 3×3 size filter in a network. However, to obtain a high performance in deep learning, a large receptive filter using a 3×3 or greater filter may be needed.

Thus, the image processing device 10 may use a 1D horizontal convolution for some convolution layers such that a network is more compact and suitable for hardware to which LR input data is to be streamed line-wise. For example, the image processing device 10 may apply a 1D horizontal convolution to the first convolution operator 220.

Thus, the first convolution operator 220 may have a rectangular receptive field having a longer length in a horizontal direction and a shorter length in a vertical direction. Thus, the image processing device 10 may reduce a line memory required to store intermediate feature maps to be as small as possible.

For effective hardware implementation, a convolution filter with such a small network may need to be maintained. However, when filter parameters are less, learning or training of a network including the DSC and the 1D horizontal convolution may be degraded.

This is because an interlayer connection in the network may be sparse due to the shortage of filter parameters, and thus learning of image reconstruction or restoration may not be performed properly.

The image processing device 10 may considerably reduce the number of filters while exhibiting a desirable SR performance by inserting a residual connection into a network.

For example, the image processing device 10 may reduce the number of filters by implementing the first convolution operator 220 in a residual block.

In terms of hardware, additional line memories may be needed to store an input of the residual connection in order to embody the residual connection by a 2D convolution, and be needed at ends of the connection.

Thus, the image processing device 10 may be readily implemented in hardware by using a delay buffer using only a 1D convolution in the residual connection. FIG. 5c illustrates a final DSC architecture having a final 1D horizontal convolution and a residual connection.

Figure 6:
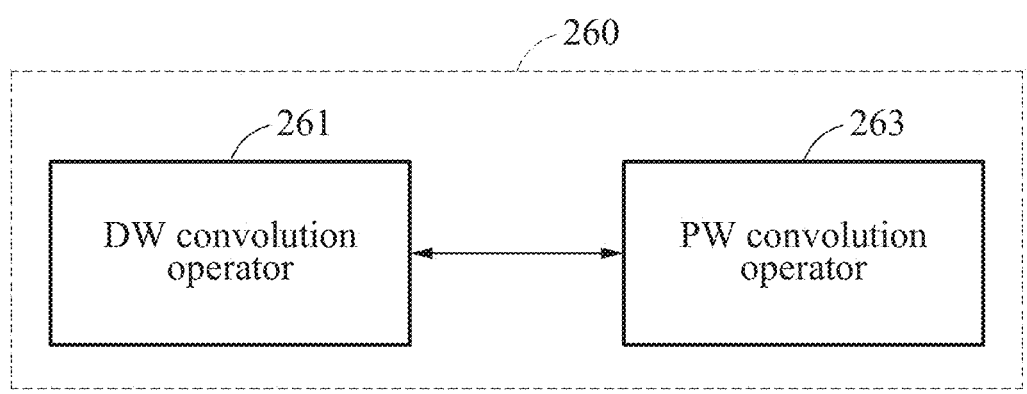
FIG. 6 is a block diagram illustrating a second convolution operator illustrated in FIG. 2.

FIG. 6 is a block diagram illustrating the second convolution operator illustrated in FIG. 2.

Referring to FIG. 6, the second convolution operator 260 includes a DW convolution operator 261, and a PW convolution operator 263 connected directly to the DW convolution operator 261. The second convolution operator 260 may include at least one 2D convolution operator configured to perform a 2D convolution operation.

The DW convolution operator 261 may perform a convolution operation in a depth direction of a feature map. The DW convolution operator 261 may perform a DW convolution operation one or more times. The PW convolution operator 263 may perform a convolution operation for each point. The PW convolution operator 263 may perform a PW convolution operation one or more times.

The 2D convolution operation may indicate a convolution operation using 2D data as an input. For example, the 2D convolution operation may indicate an m×n convolution. In this example, m and n, which denote a length of line-wise data, may have an arbitrary integer value greater than or equal to 2.

Although a 3×3 convolution is provided herein as an example of the 2D convolution, the 2D convolution used by the image processing device 10 is not limited to such an example convolution.

The DW convolution operator 261 may perform a convolution operation in a depth direction of a feature map, whereas the PW convolution operator 263 may perform a convolution operation for each point.

The DW convolution operator 261 may include at least one 2D convolution operator. The PW convolution operator 263 may perform a 1×1 convolution.

Similar to the first convolution operator 220, the second convolution operator 260 may also perform a convolution operation using a DSC. For a detailed description of the DSC, reference may be made to the description of the DSC provided above with respect to the first convolution operator 220.

Figure 7:
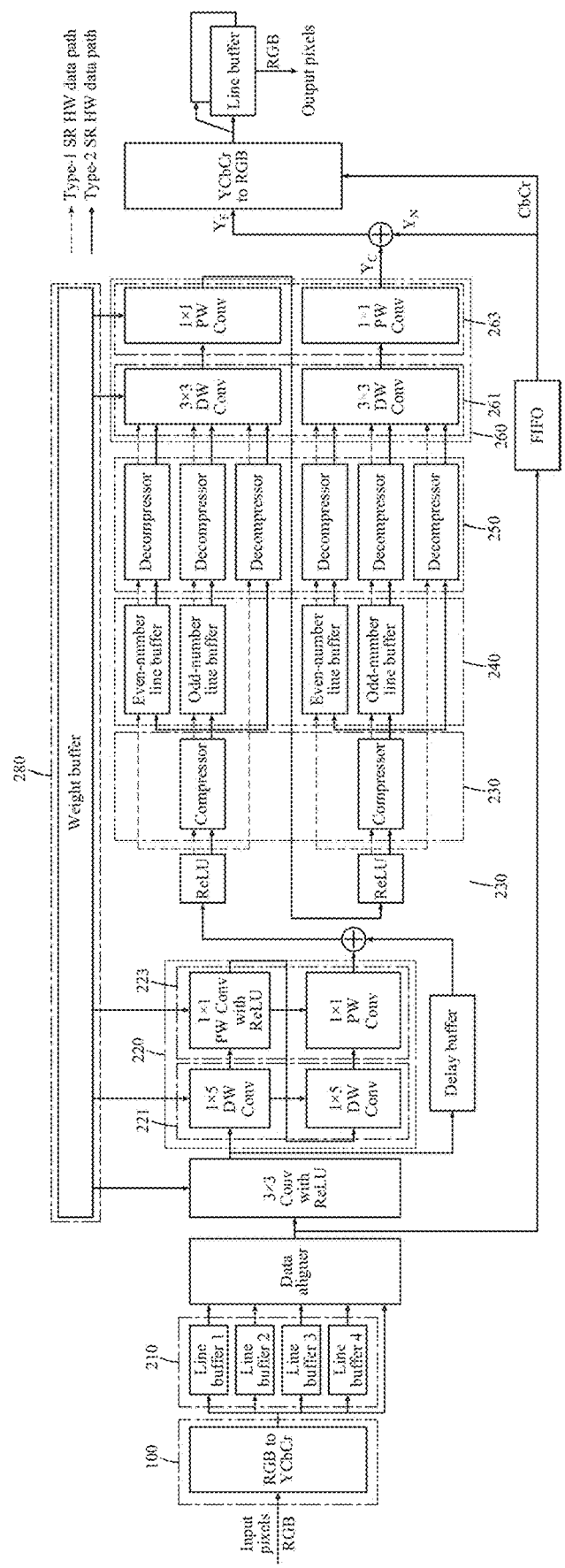
FIG. 7 illustrates an example of a hardware architecture of the image processing device illustrated in FIG. 1.

FIG. 7 illustrates an example of a hardware architecture of the image processing device illustrated in FIG. 1.

The image processing device 10 may process an LR image to generate an HR image. For example, the image processing device 10 may generate a 4K UHD image from an FHD image.

FIG. 7 illustrates a pipeline hardware architecture for SR, which is designed by two types—Type 1 without compression of intermediate feature maps, and Type 2 with the compression.

Details of the example illustrated in FIG. 7 are as indicated in Table 3 below.

TABLE 3

| Type/Stride/Padding | Filter Shape | Input/Output Size | Remarks |
|---|---|---|---|
|  |  | 1920 × 1080 × 1 | Input Y |
| Conv/(1, 1)/(1, 1) | 3 × 3 × 1 × 32 | 1920 × 1080 × 32 |  |
| ReLU | — | 1920 × 1080 × 32 |  |
| DW Conv/(1, 1)/(0, 2) | 1 × 5 × 32 dw | 1920 × 1080 × 32 | Residual |
| PW Conv/(1, 1)/(0, 0) | 1 × 1 × 32 × 16 | 1920 × 1080 × 16 | Block |
| ReLU | — | 1920 × 1080 × 16 |  |
| DW Conv/(1, 1)/(0, 2) | 1 × 5 × 16 dw | 1920 × 1080 × 16 |  |
| PW Conv/(1, 1)/(0, 0) | 1 × 1 × 16 × 32 | 1920 × 1080 × 32 |  |
| ReLU | — | 1920 × 1080 × 32 |  |
| DW Conv/(1, 1)/(1, 1) | 3 × 3 × 32 dw | 1920 × 1080 × 32 |  |
| PW Conv/(1, 1)/(0, 0) | 1 × 1 × 32 × 16 | 1920 × 1080 × 16 |  |
| ReLU | — | 1920 × 1080 × 16 |  |
| DWConv/(1, 1)/(1, 1) | 3 × 3 × 16 dw | 1920 × 1080 × 16 |  |
| PWConv/(1, 1)/(0, 0) | 3 × 3 × 16 × 4 | 1920 × 1080 × 4 |  |
| Pixel Shuffle | depth-to-space | 3840 × 2160 × 1 | $Y_C$ |
| Nearest Neighbor | 2× up-sample | 3840 × 2160 × 1 | $Y_N$ |
| Residual Network | $Y_N + Y_C$ | 3840 × 2160 × 1 | Output $Y_F$ |

As illustrated, the image processing device 10 includes a first pixel information converter, the first line buffer 210, a data aligner, the DW convolution operator 221, the PW convolution operator 223, the compressor 230, the second line buffer 240, the decompressor 250, the DW convolution operator 261, the PW convolution operator 263, the quantizer 270, the weight buffer 280, a second pixel information converter, and a third line buffer.

An image received by the first pixel information converter may include color data. For example, the color data may include RGB channel data and YCbCr channel data.

The first pixel information converter may convert first color data to second color data. The first color data may include RGB channels, and the second color data may include YCbCr channels. For example, the first pixel information converter may convert RGB channels of an LR input image to YCbCr channels.

The first line buffer 210 may include four line buffers, for example. The DW convolution operator 221 may perform a 1×5 convolution operation. The second line buffer 240 may include an even-number line buffer and an odd-number line buffer.

The DW convolution operator 261 may perform a 3×3 convolution operation. The second pixel information converter may convert the second color data to the first color data. For example, the second pixel information converter may convert the YCbCr channels to the RGB channels.

The weight buffer 280 may store a parameter, or a filter parameter, that is used for a convolution operation. The weight buffer 280 may update parameters received from convolution operators.

The third line buffer may include a plurality of line buffers. The third line buffer may include four output line buffers, for example.

Outputs of all the convolution operators may be quantized through the quantizer 270, and all weight parameters may also be quantized through the quantizer 270.

The quantizer 270 may convert a 32-bit floating point to a 10-bit fixed point. The weight buffer 280 may store the quantized weight parameters.

In FIG. 7, arrows indicate respective data paths. That is, illustrated are a data path based on Type 1, and a data path based on Type 2.

The image processing device 10 may operate in a pipeline structure. The pipeline structure may indicate a structure in which an output in one step of processing data is connected to an input in a next step of processing the data. Connected steps of processing data may be performed concurrently or in parallel.

That is, the components included in the image processing device 10 may operate concurrently or in parallel to process an image. For example, at least one convolution operation of the image processing device 10 may operate in a form of a pipeline.

The convolution operators may load convolution filter parameters from the weight buffer 280. Subsequently, the first pixel information converter may extract a YCbCr value from an RGB input stream. The first line buffer 210 may store four rows of an YCbCr LR input image to be used for nearest neighboring point upscaling to obtain an interpolated image for a residual connection at an end of a network.

The data aligner may re-align data of the four line buffers of the first line buffer 210 and the input stream, and generate 3×3 size YCbCr LR patches. A Y channel of the LR patches may be transmitted to a 3×3 convolution layer.

After a first convolution operation, a feature map may pass through a ReLU activation function. Subsequently, an output of the ReLU function may pass through the first convolution operator 220. The first convolution operator 220 may generate a feature map, or an intermediate feature map.

The compressor 230 may compress the intermediate feature map that has passed through a residual block and a ReLU, and the second line buffer 240 may store the compressed feature map.

The decompressor 250 may read data stored in the second line buffer 240, and decompress the read data at a one-delayed line data-enable (DE) timing. The DW convolution operator 261 may perform a 3×3 convolution operation on the decompressed data, and the PW convolution operator 263 may perform a 1×1 convolution operation on an output of the DW convolution operator 261.

After an output of the PW convolution operator 263, the number of channels of a feature map may be reduced by half from 32 to 16. The feature map with the reduced number of channels may pass again through the compressor 230, the second line buffer 240, and the decompressor 250 in sequential order. Subsequently, convolution operations may be performed again by the DW convolution operator 261 and the PW convolution operator 263.

An output of such repeated convolution operations may be configured by four channels to be used to generate a 2×2 HR patch through a similar method as that used for a sub pixel convolution.

The image processing device 10 may then obtain a final Y ($Y_F$) by adding 2×2 super-resolved Y data ($Y_C$) and 2× up-sampled data ($Y_N$) through a nearest neighbor interpolation method.

To synchronize two timings of $Y_C$ and $Y_N$, the $Y_N$ data may be stored first-in, first-out (FIFO), and read at a same timing as $Y_C$. In addition, CbCr data delayed from the FIFO may also be up-sampled by two times based on the nearest neighbor interpolation method to be transmitted to the second pixel information converter to obtain RGB pixels.

Two output buffers of the third line buffer may store generated 2×2 RGB HR patches, which may be transmitted to a display device at an output timing for each output clock cycle.

To prevent a read/write collision for the 2×2 RGB HR patches using a dual buffering structure for stream processing, four line buffers may be used as the third line buffer.

Figure 8:
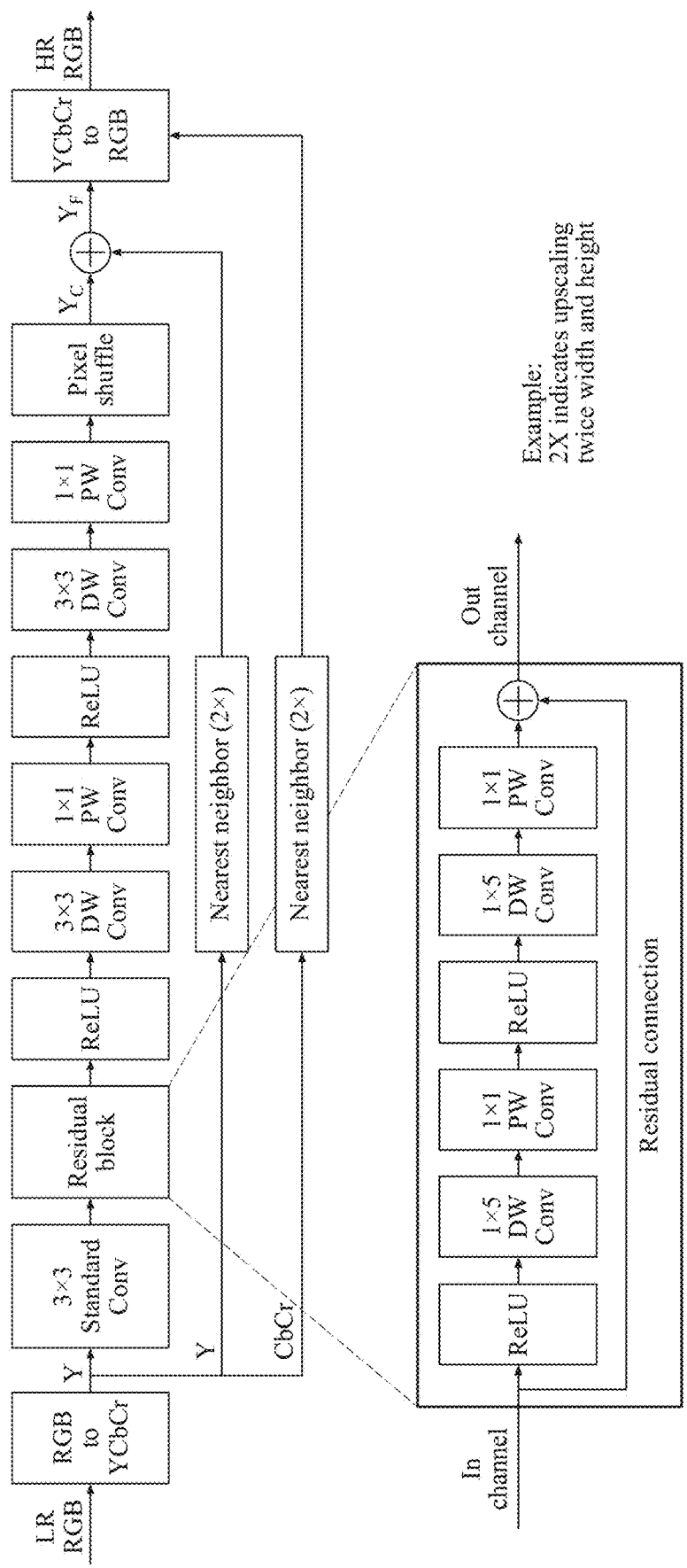
FIG. 8 illustrates an example of an architecture of a neural network used by the image processing device illustrated in FIG. 1.

FIG. 8 illustrates an example of an architecture of a neural network used by the image processing device illustrated in FIG. 1.

Referring to FIG. 8, the image processing device 10 may process an image using a hardware-friendly CNN-based SR network.

The image processing device 10 may process the image using only a portion of color data. For example, the image processing device 10 may process the image by inputting, to the CNN network, only a luminance signal channel (Y) among YCbCr channels. A level of performance of learning using only the Y channel may be similar to a level of performance of learning using RGB channels.

When training the CNN network with the RGB channels, the number of parameters used for the RGB channels may be three times greater than the number of parameters used only for the Y channel in a 2D convolution of a first layer and a PW convolution of a last layer.

Here, color difference signal (Cb, Cr) channel data may be up-scaled using an interpolation method. The interpolation method may include a bicubic interpolation and a nearest neighbor interpolation.

For example, the image processing device 10 may perform the up-scaling using the nearest neighbor interpolation which may be simpler than the bicubic interpolation to reduce complexity and improve hardware efficiency. In addition, the image processing device 10 may train the neural network using a residual learning technique to reduce the complexity.

The image processing device 10 may calculate a final HR image $Y_F$ by adding an interpolated LR image $Y_N$ and an output $Y_C$ of the network. The calculation may be represented by Equation 5.

$$Y_F = Y_N + Y_C \quad \text{[Equation 5]}$$

To use as less convolution filter parameters and line memories as possible, the image processing device 10 may combine a DSC, an 1D horizontal convolution, and a residual connection.

Thus, the number of filter parameters may be approximately 21 times less than an existing extension of a super-resolution convolutional neural network (SRCNN) (SRCNN-Ex), approximately 4.5 times less than a fast SRCNN (FSRCNN), and approximately 1.56 times less than a small model size version of an FSRCNN (FSRCNN-s), while levels of PSNR and SSIM performance may be similar to those of the SRCNN-Ex.

As described above with reference to FIG. 8, the image processing device 10 may perform a convolution operation through two 2D convolution layers and one 1D convolution layer. For example, a 2D convolution operation may be a 3×3 convolution operation, and the 1D convolution operation may be a 1×5 convolution operation. In this example, a total receptive field size may be 7×15.

Figure 9:
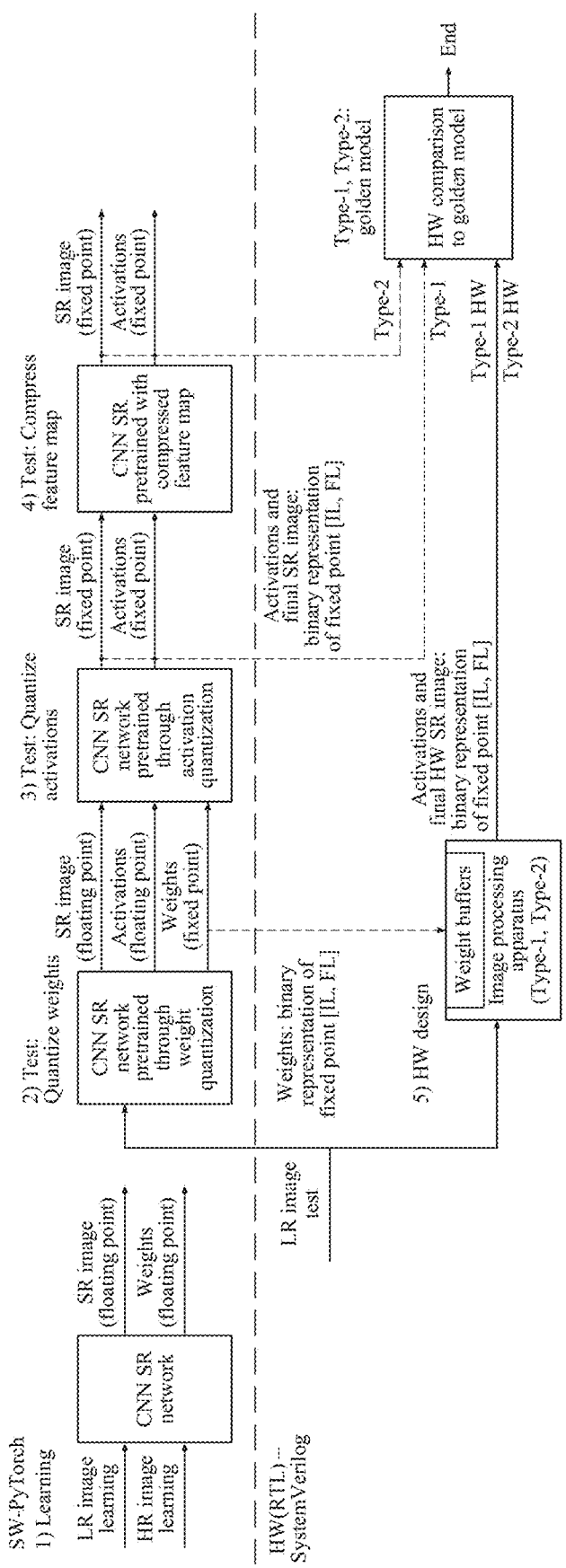
FIG. 9 illustrates an example of a framework for verifying the image processing device illustrated in FIG. 1.

FIG. 9 illustrates an example of a framework for verifying the image processing device illustrated in FIG. 1.

Referring to FIG. 11, to compare the image processing device 10 to a bicubic method and an existing CNN-based SR method, performance is evaluated with respect to a general dataset. Through such a performance evaluation, performance of the image processing device 10 may be compared to those of software-based methods including, for example, SRCNN, SRCNN-Ex, FSRCNN, FSRCNN-s, and very deep SR (VDSR). In addition, performance of the image processing device 10 may be compared to those of other real-time SR hardware in terms of gate count and operating frequency.

A generally used benchmark dataset may be used for learning and tests. An SR network may be trained or learned using 291 images including 91 images from Yang et al. and 200 images from Berkeley segmentation dataset.

For the comparison of performances, test set 1 and test set 2 may be used. Test set 1 may include Set5, Set14, B100, and Urban100, which may be frequently used as an SR benchmark for many methods. Test set 2 may include eight 4K UHD images, and used for tests.

All tests or experiments may be performed with a scale factor of 2 times for SR. A PSNR and an SSIM may be used as a measure or a metric for the evaluation. The SR may be performed for a luminance channel of a YCbCr color space, and thus the PSNR and the SSIM may be calculated using a Y channel of a reconstructed original HR image.

For learning and tests, an LR input image may be intentionally generated through down-sampling from the original HR image using a double scale bicubic interpolation. For learning, 128×128 size sub-images may be randomly cropped. Through rotation, reflection, and scaling, an LR-HR learning image pair may be augmented.

Weights may be initialized using a uniform distribution, and a bias may not be used to reduce the number of parameters. L1 loss may be used, in lieu of L2 loss, as a cost function. The SR network suggested herein may be trained or learned using an Adam optimizer.

A learning rate may be set to be 0.0001 and be reduced by 10 for each 50 epoch. During the learning or training, a size of mini-batch may be set to be 2. For a learning or training test, a NVIDIA Titan X graphics processing unit (GPU) of 3.4 gigahertz (GHz) and an Intel Core i7-6700 central processing unit (CPU) may be used.

During calculation of a floating point in a learning or training stage, a weight parameter of the SR network may be quantized from the floating point to a fixed point according to Equation 2 in a test stage.

In addition, by quantizing activations of all convolution layers and using a compression method, only feature maps of 3×3 size DW convolution layers may be compressed. An optimal quantization bit for weights and activations may be experimentally discovered, and a quantized weight parameter may be used in the image processing device 10.

In an algorithm stage, a compressed intermediate feature map and a final SR image may be used as a golden model to be compared to a designed hardware simulation result.

Figure 10A:
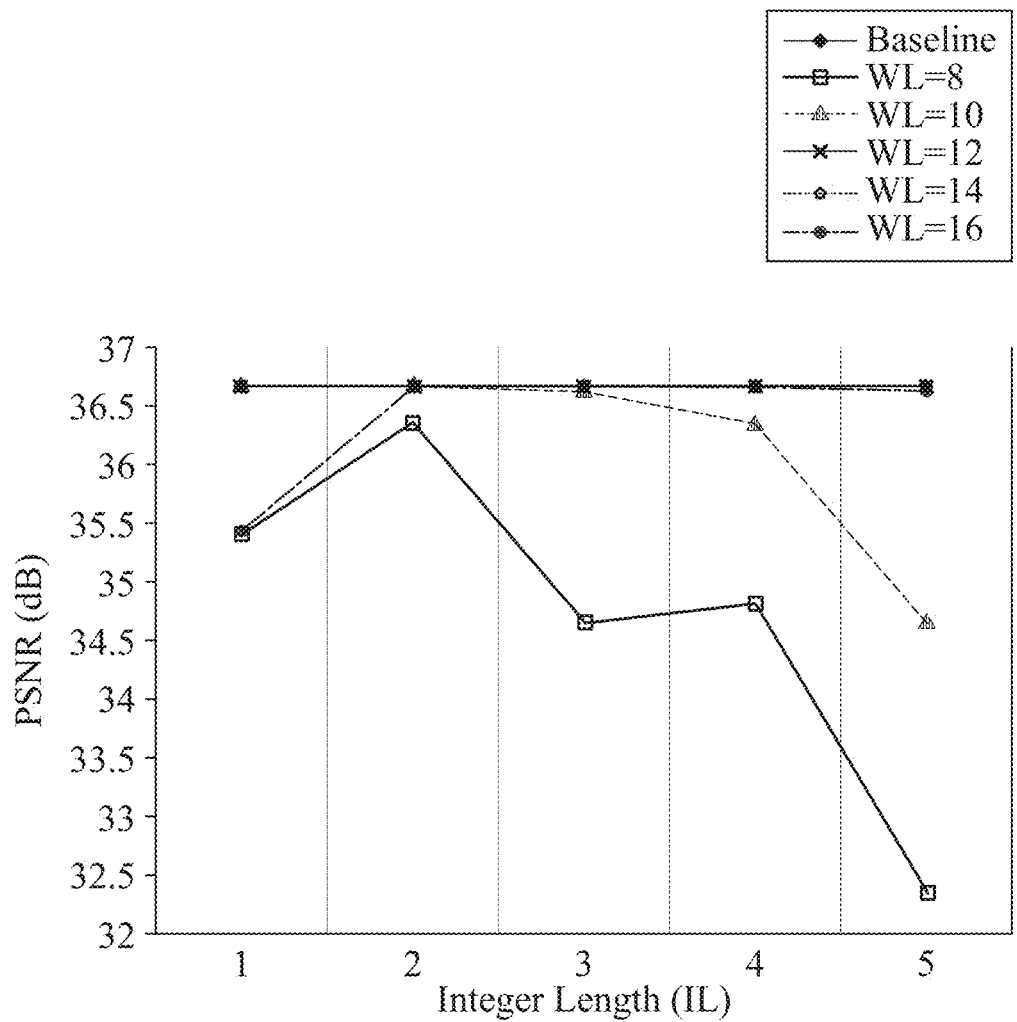
FIG. 10a illustrates an example of performance of the image processing device illustrated in FIG. 1.
Figure 10B:
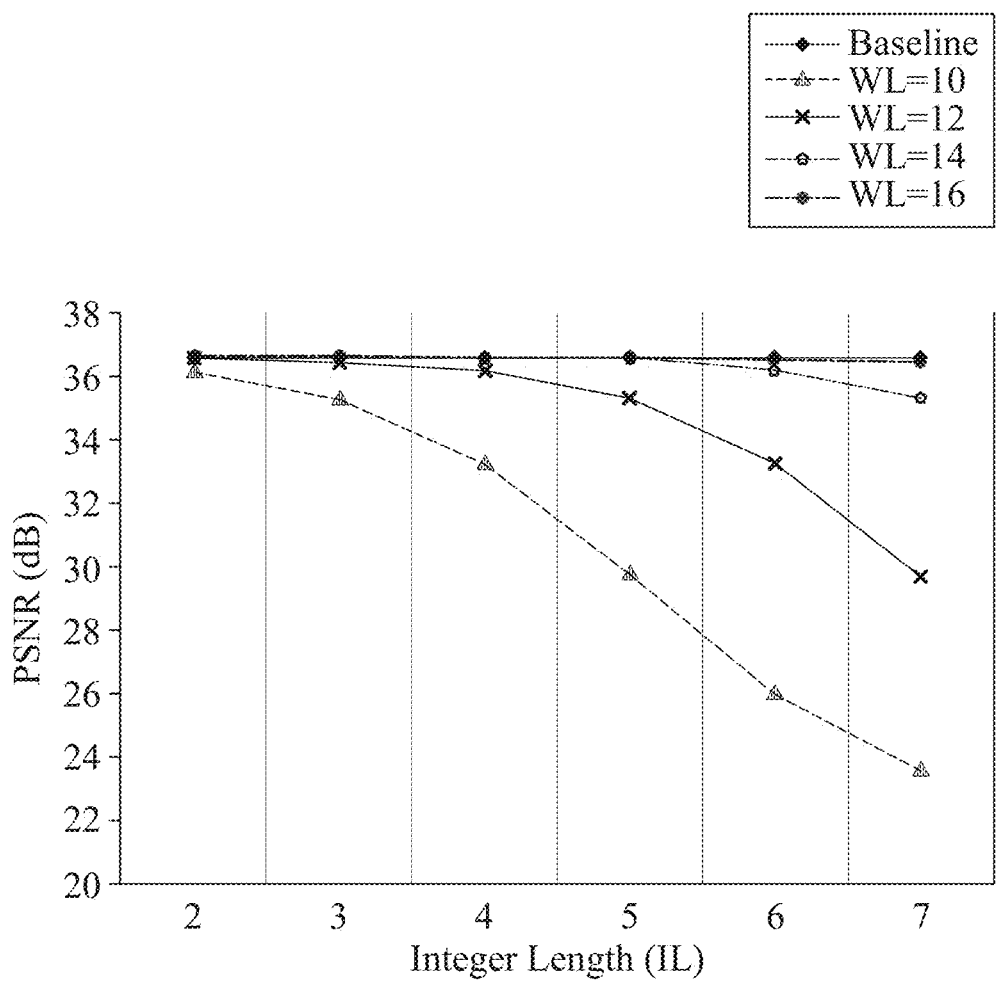
FIG. 10b illustrates another example of performance of the image processing device illustrated in FIG. 1.
Figure 10C:
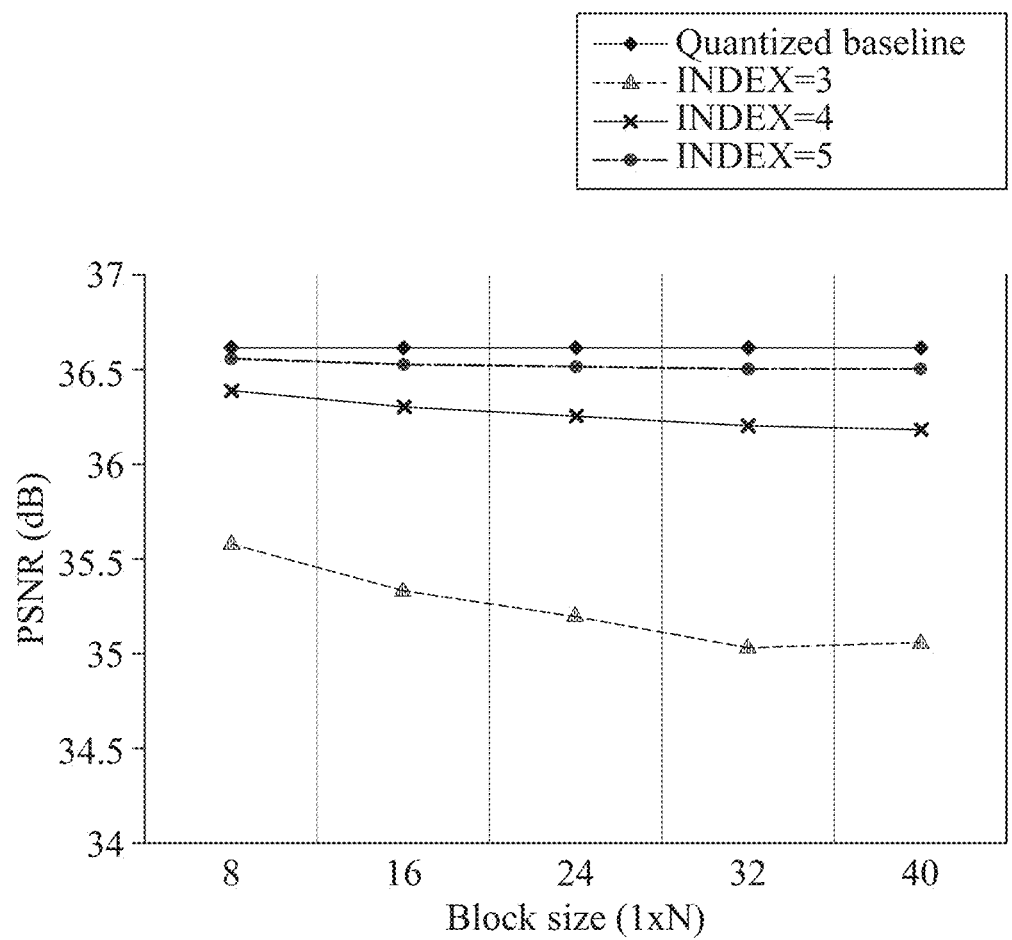
FIG. 10c illustrates still another example of performance of the image processing device illustrated in FIG. 1.

FIG. 10a illustrates an example of performance of the image processing device illustrated in FIG. 1. FIG. 10b illustrates another example of performance of the image processing device illustrated in FIG. 1. FIG. 10c illustrates still another example of performance of the image processing device illustrated in FIG. 1.

Referring to FIGS. 10a through 10c, weight parameters and activations may be quantized for hardware implementation. The quantization of weight parameters and activations may greatly affect a quality of an output image, and thus it may need to discover a desirable quantization bit depth. That is, suitable values for three parameters described above-word length (WL), integer length (IL), and fraction length (FL)—may be required. Thus, experiments may be performed by varying such parameters WL, IL, and FL with respect to various datasets.

FIG. 10a is a graph of PSNR with respect to WL and IL that quantize weight parameter values for a dataset, Set5. It is verified in FIG. 10a that, when a bit depth is greater than or equal to 10, PSNR performance of an SR network may be similar to that in a case that there is no quantization of weights and activations. In addition, it is verified that the PSNR performance is reduced greatly at IL being 4 (IL=4) or greater with respect to a 10-bit WL.

An FL bit depth may affect more greatly the PSNR performance than the IL bit depth, due to the use of a residual network as represented by Equation 5. For the quantization of weight parameters, the WL bit depth may be set to be 10 bit and the IL bit depth may be set to be 2 bit. This may also be used for the quantization of activations and the compression of intermediate feature maps.

FIG. 10b is a graph of PSNR performance of an SR network with respect to WL and IL bit depths for the quantization of activations. Based on a result of an experiment as illustrated in FIG. 10b, WL may be set to be 14 bit and IL may be set to be 2 bit for the quantization of activations.

FIG. 10c illustrates a result of an experiment on a compression method applied to a quantized feature map to reduce the use of line memories. The experiment is performed to verify PSNR performance with respect to various block sizes and indices (quantization levels). As a value of a quantization level for the compression decreases, a compression ratio may increase, but the PSNR performance may decrease.

Based on a result illustrated in FIG. 10c, a compromise between line memories requiring a 32-bit block size and a 5-bit index size (quantization level), and the result PSNR may be selected.

Figure 11A:
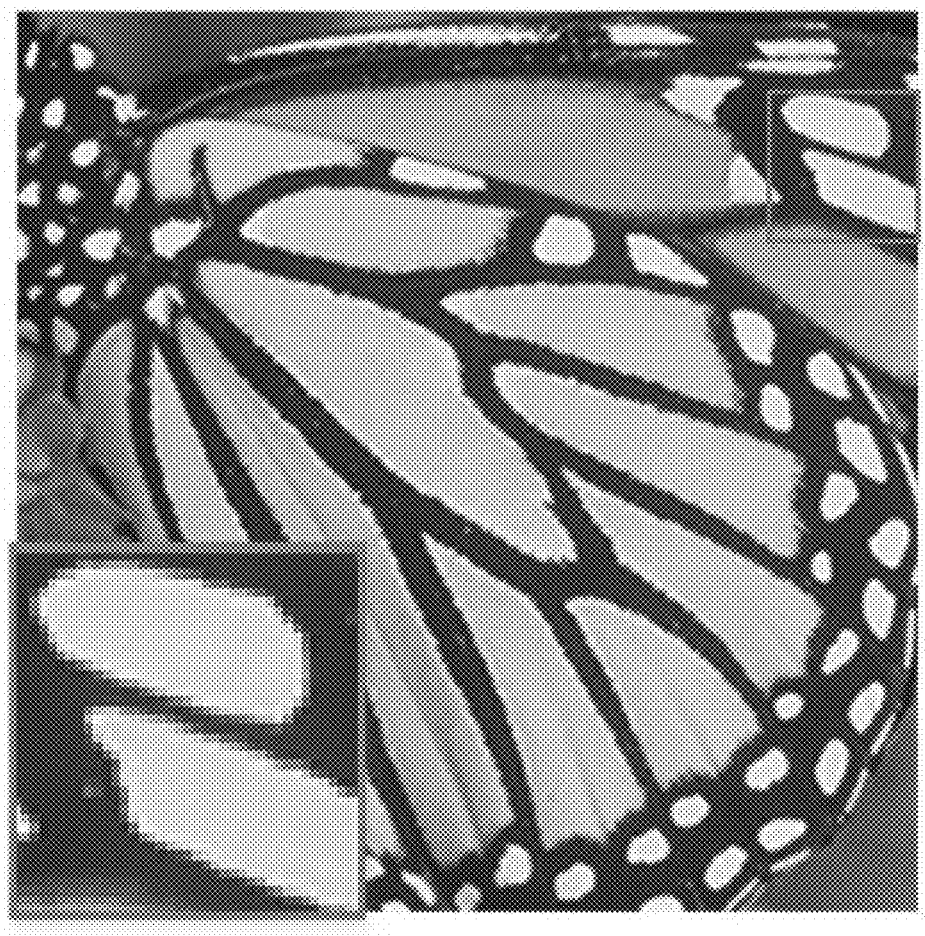
FIG. 11a is an example of an original high-resolution image.
Figure 11B:
FIG. 11b is an example of an image processed through a bicubic method.
Figure 11C:
FIG. 11c is an example of an image processed through a super-resolution convolutional neural network (SRCNN) method.

FIG. 11a is an example of an original HR image. FIG. 11b is an example of an image processed through a bicubic method. FIG. 11c is an example of an image processed through an SRCNN method.

Figure 11D:
FIG. 11d is an example of an image processed through an SRCNN-Ex method which is an extension of the SRCNN method.
Figure 11E:
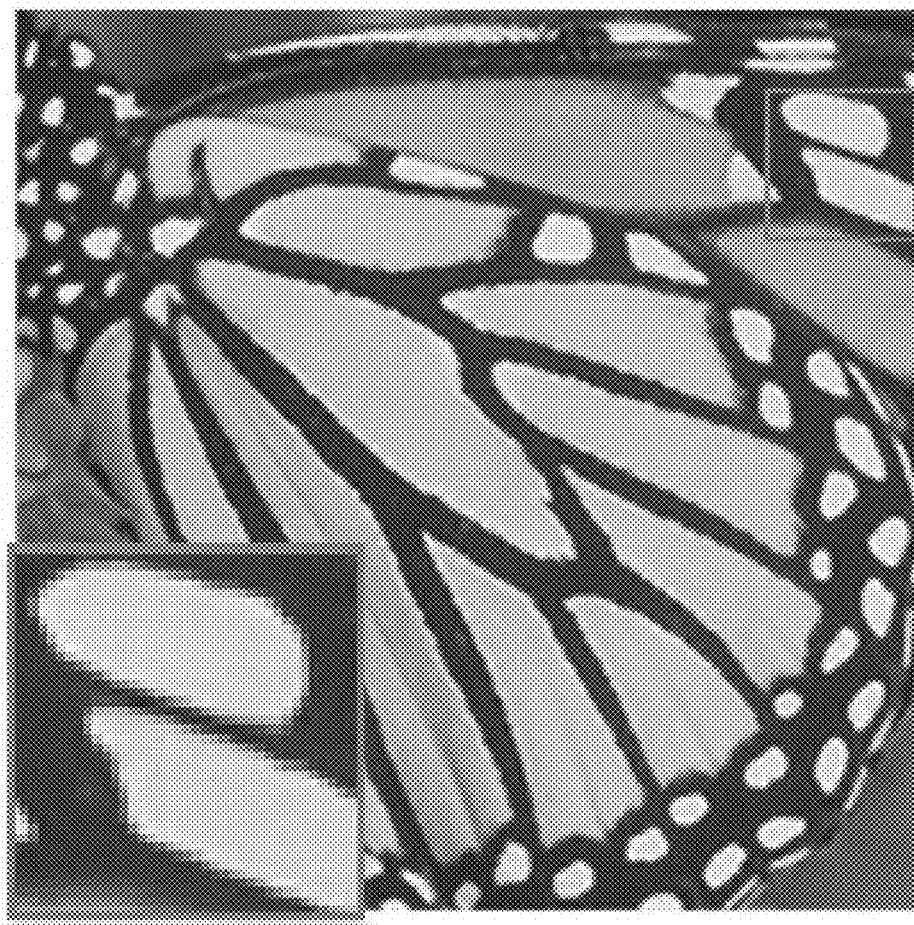
FIG. 11e is an example of an image processed through a fast SRCNN (FSRCNN) method.
Figure 11F:
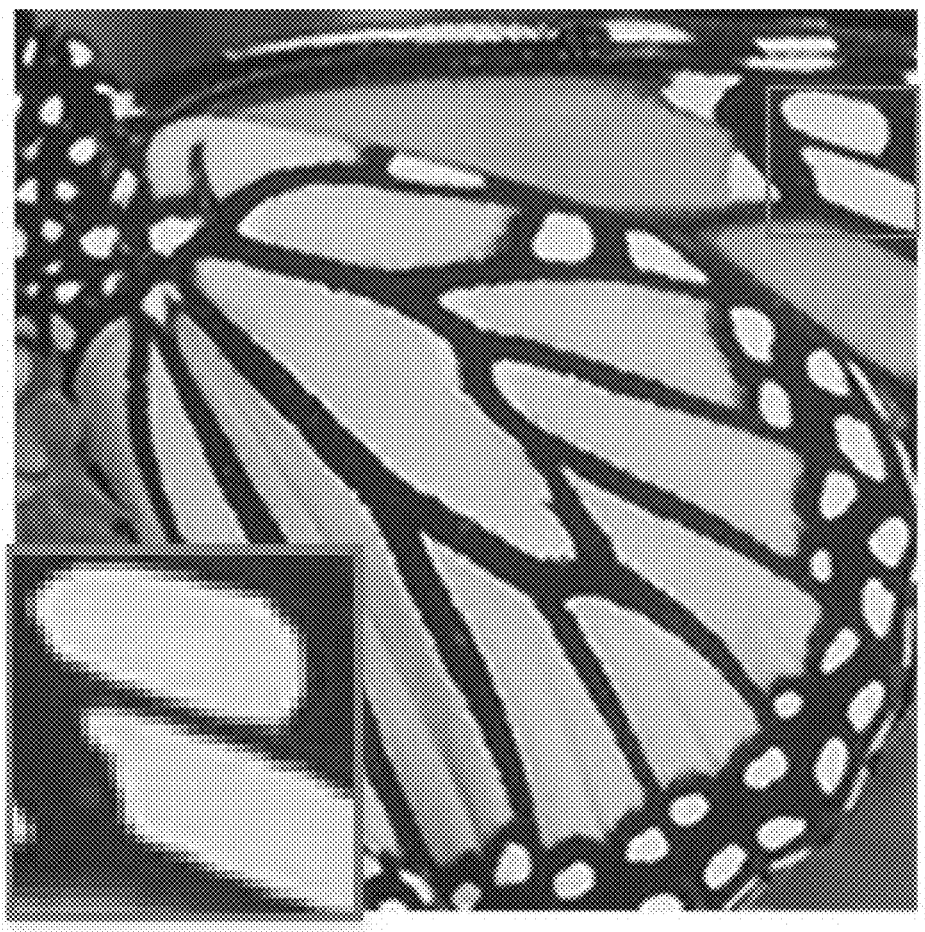
FIG. 11f is an example of an image processed through an FSRCNN-s method which is a small model size version of the FSRCNN method.

FIG. 11d is an example of an image processed through an SRCNN-Ex method, an extension of SRCNN. FIG. 11e is an example of an image processed through an FSRCNN method. FIG. 11f is an example of an image processed through an FSRCNN-s method, a small model size version of FSRCNN.

Figure 11G:
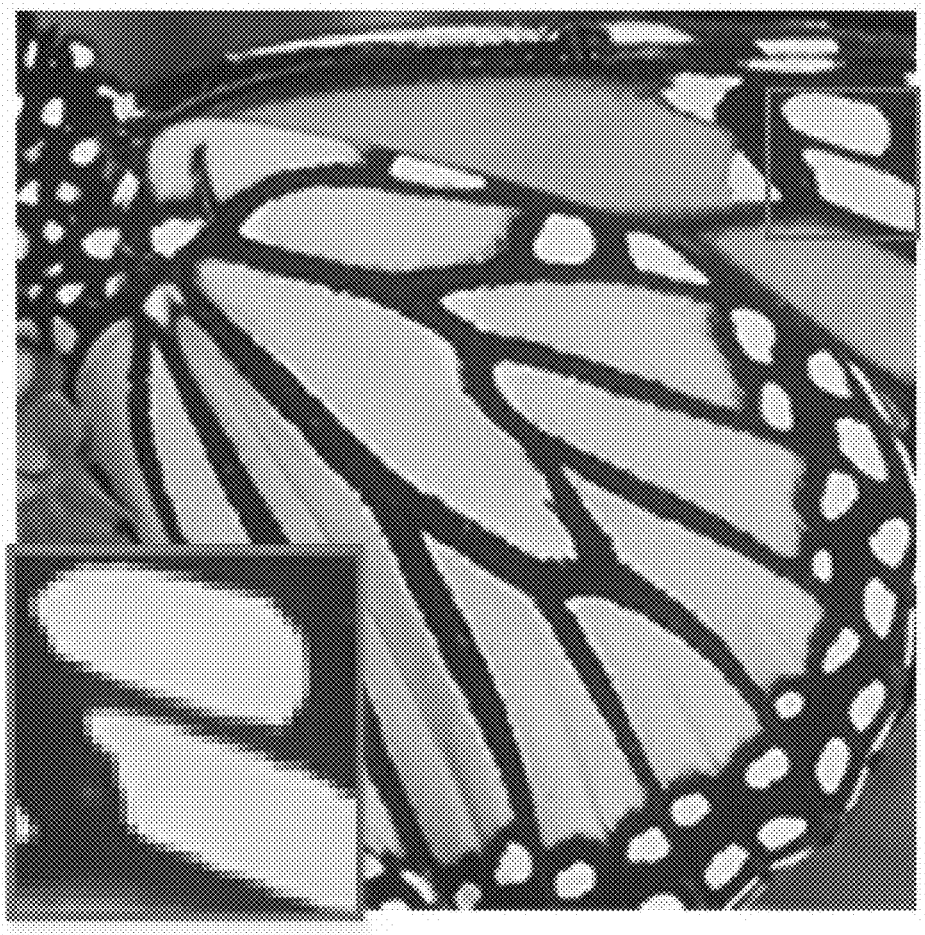
FIG. 11g is an example of an image processed through a very deep super resolution (VDSR) method.
Figure 11H:
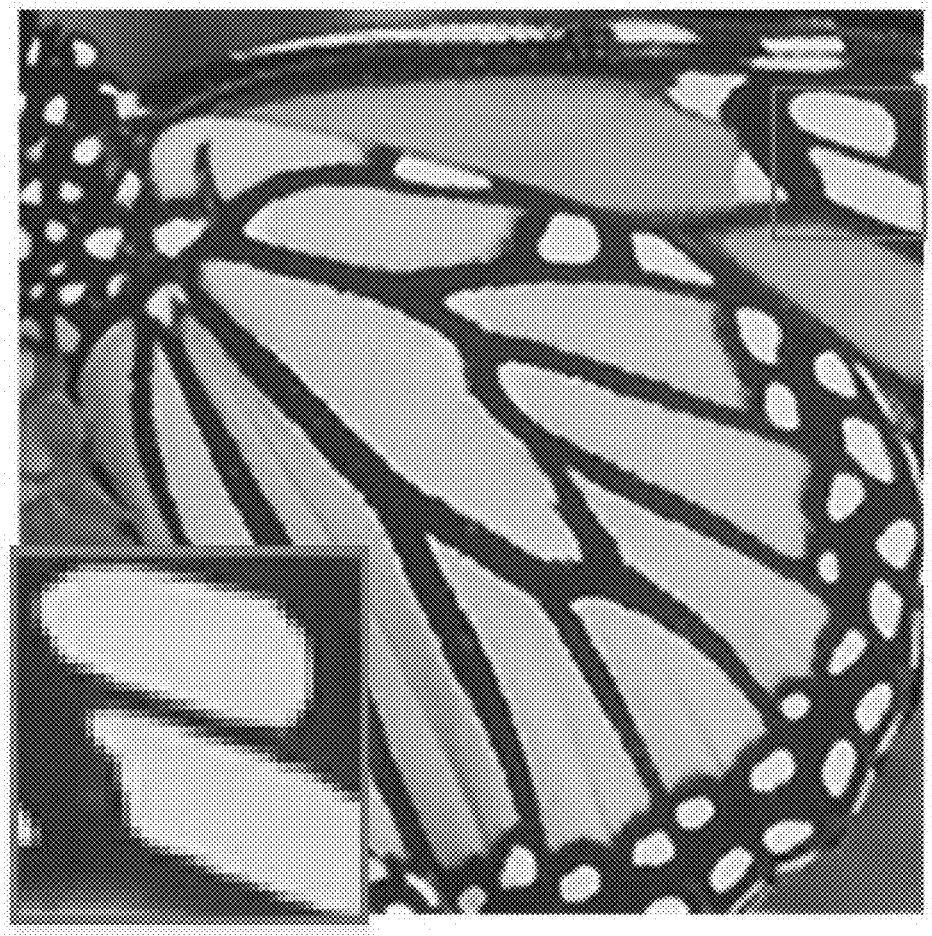
FIG. 11h is an example of an image processed by the image processing device illustrated in FIG. 1 using a quantized weight.

FIG. 11g is an example of an image processed through a VDSR method. FIG. 11h is an example of an image processed by the image processing device illustrated in FIG. 1 using a quantized weight.

Figure 11I:
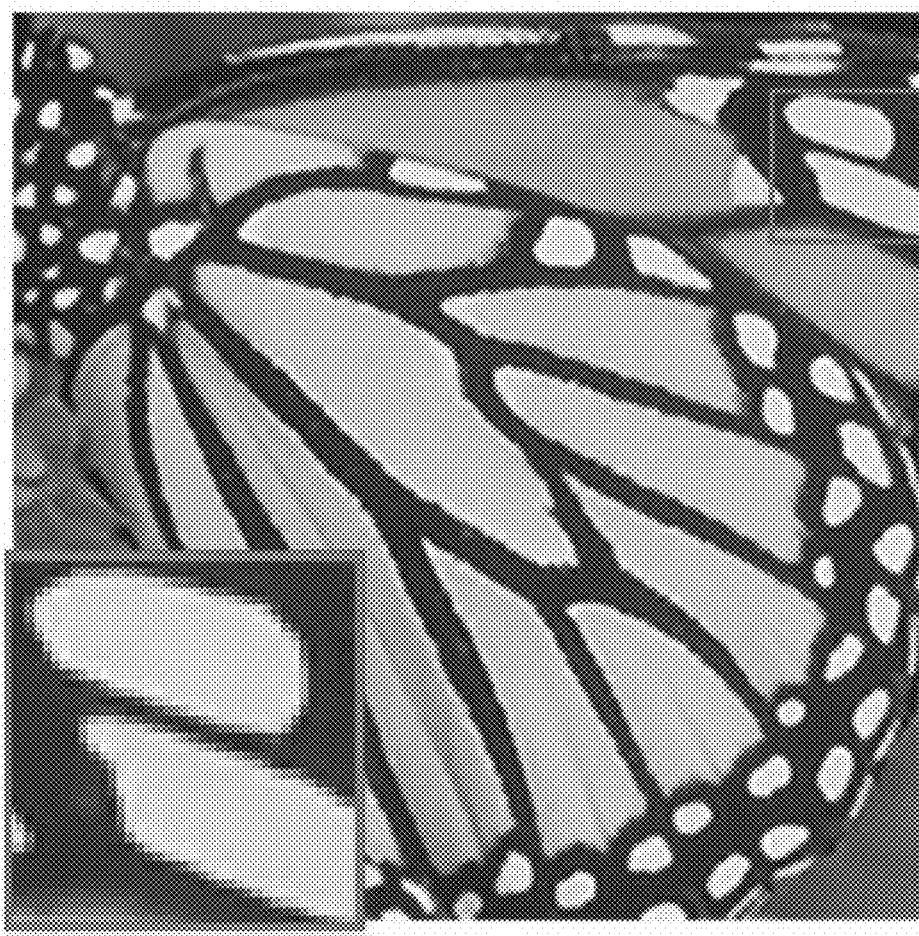
FIG. 11i is an example of an image processed by the image processing device illustrated in FIG. 1 using a quantized weight and activation.
Figure 11J:
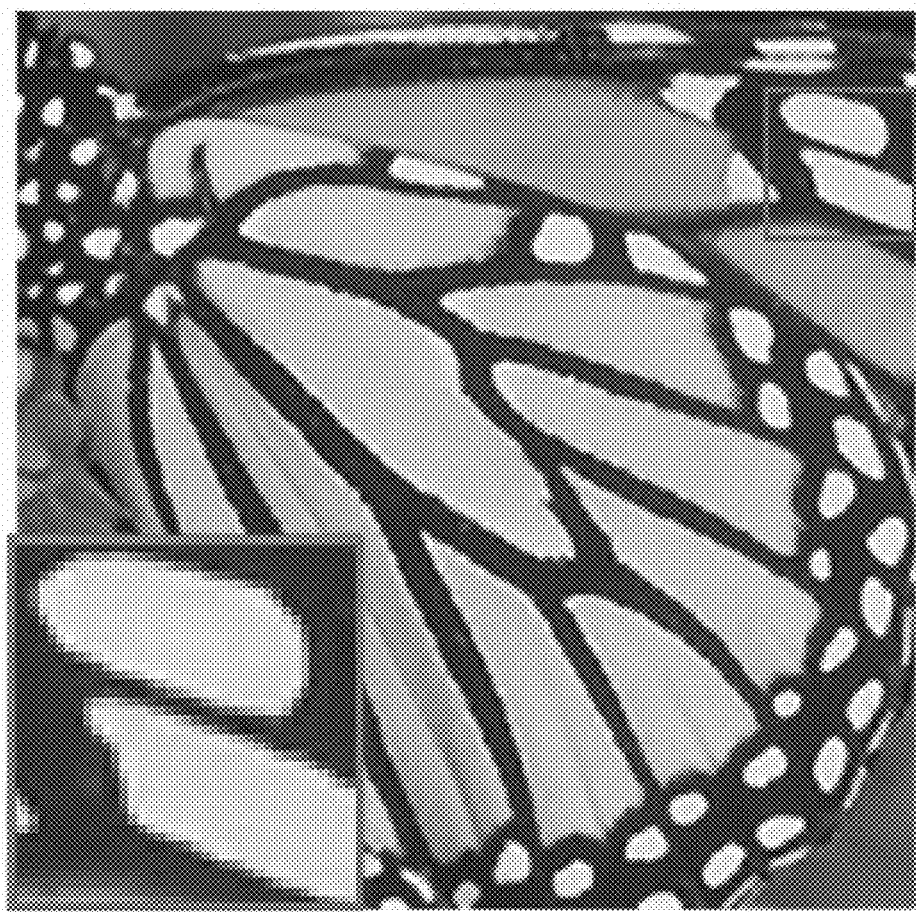
FIG. 11j is an example of an image processed by the image processing device illustrated in FIG. 1 using a quantized weight and activation, and compression of an intermediate feature map.

FIG. 11i is an example of an image processed by the image processing device illustrated in FIG. 1 using a quantized weight and activation. FIG. 11j is an example of an image processed by the image processing device illustrated in FIG. 1 using a quantized weight and activation, and compression of an intermediate feature map.

Figure 12A:
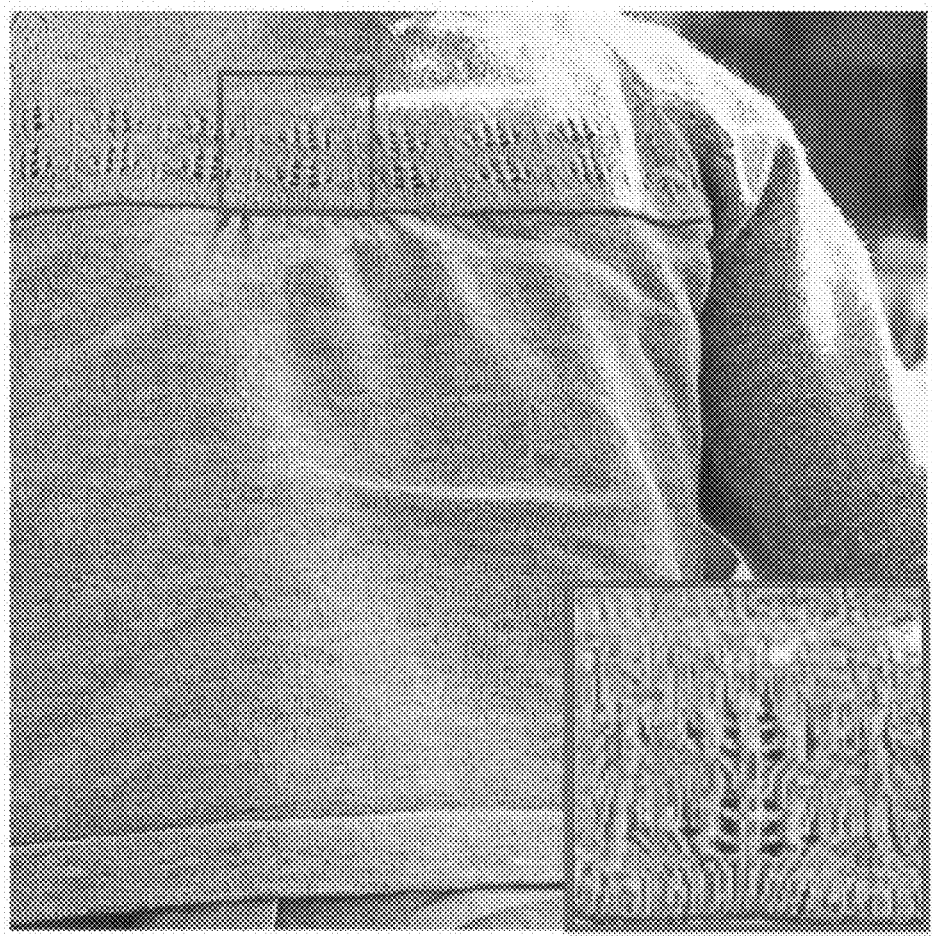
FIG. 12a is another example of an original high-resolution image.
Figure 12B:
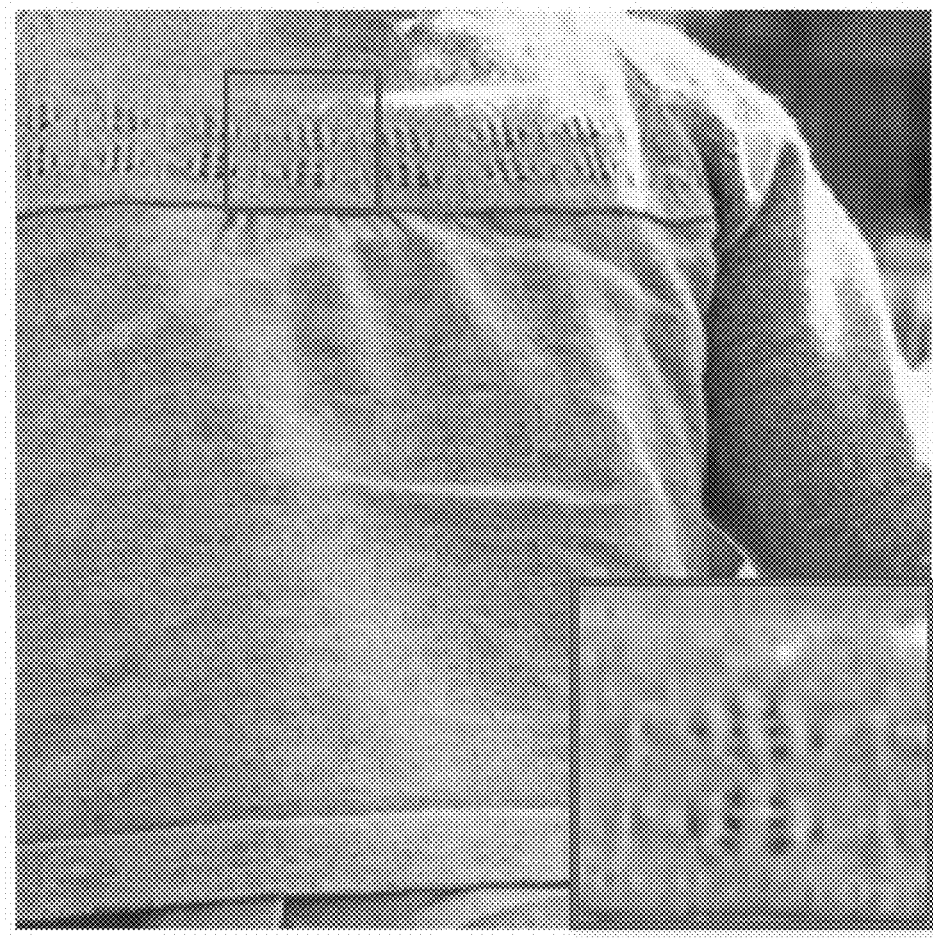
FIG. 12b is another example of an image processed through a bicubic method.
Figure 12C:
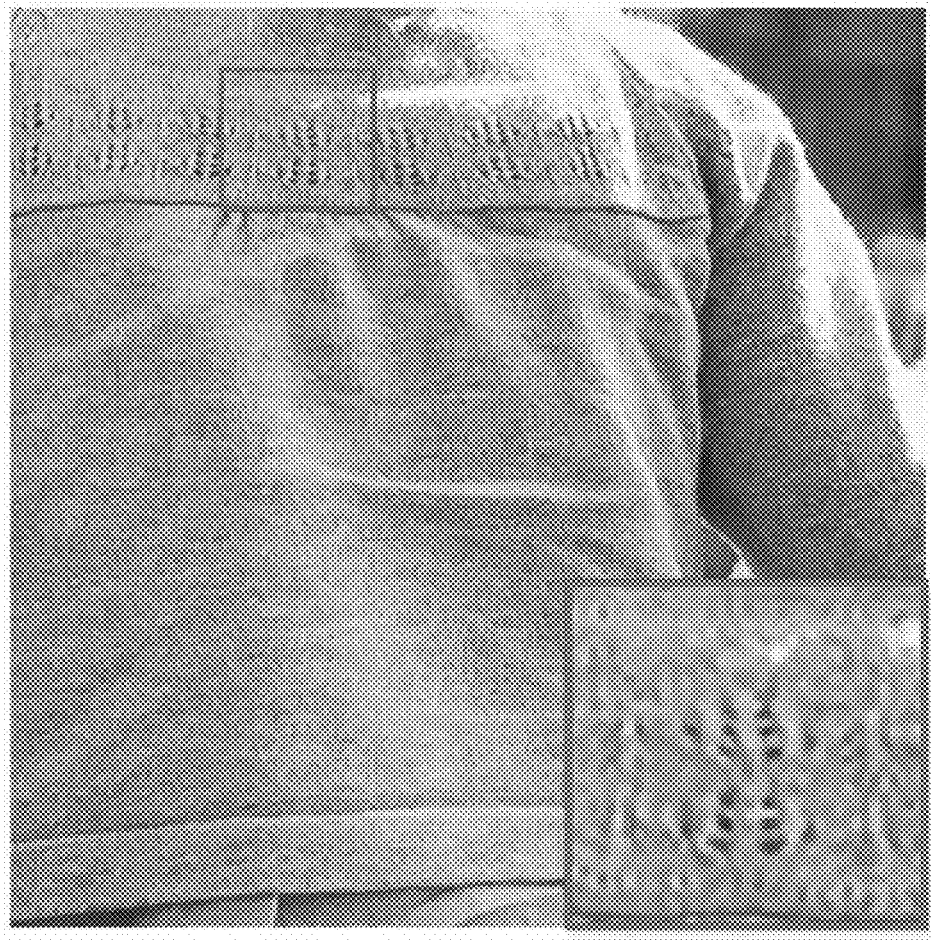
FIG. 12c is another example of an image processed through an SRCNN method.

FIG. 12a is another example of an original HR image. FIG. 12b is another example of an image processed through a bicubic method. FIG. 12c is another example of an image processed through an SRCNN method.

Figure 12D:
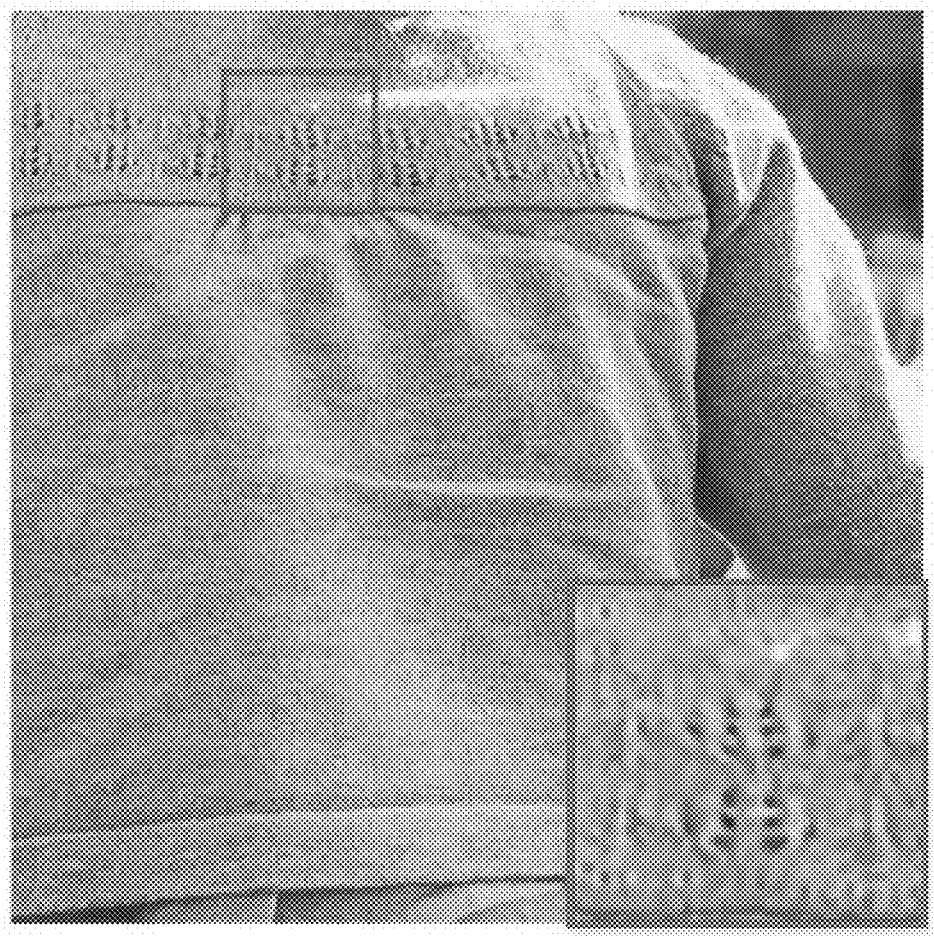
FIG. 12d is another example of an image processed through an SRCNN-Ex method.
Figure 12E:
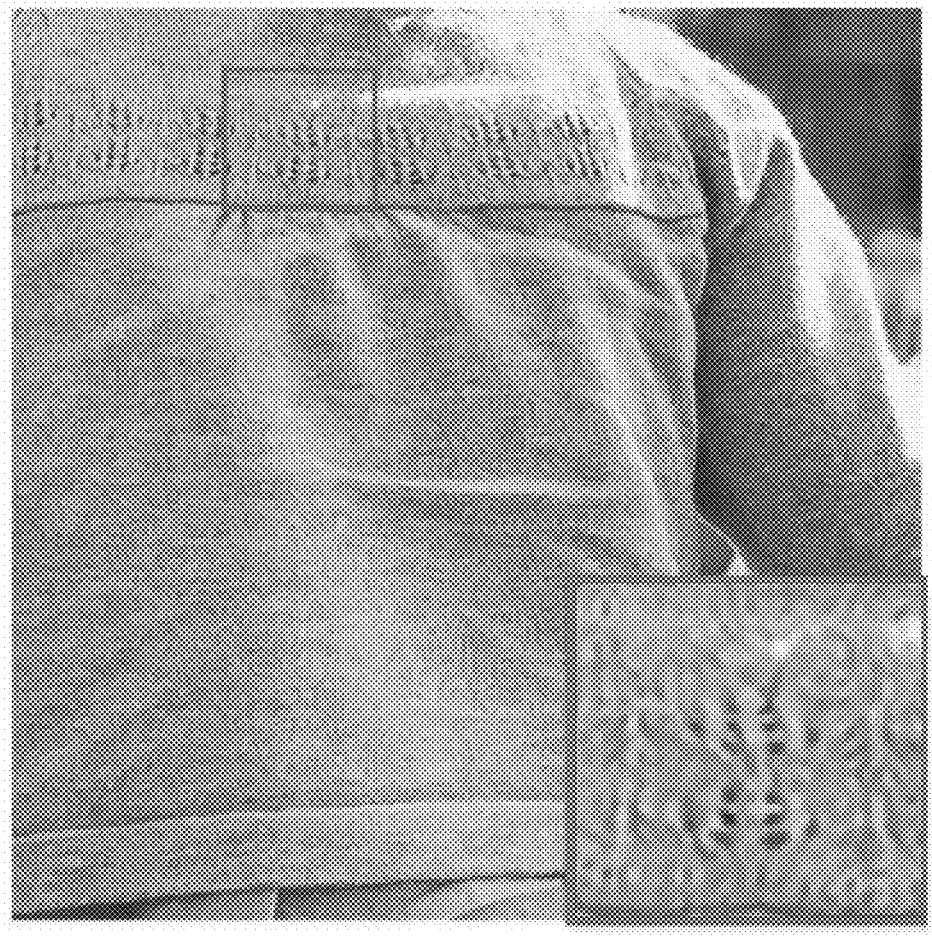
FIG. 12e is another example of an image processed through an FSRCNN method.
Figure 12F:
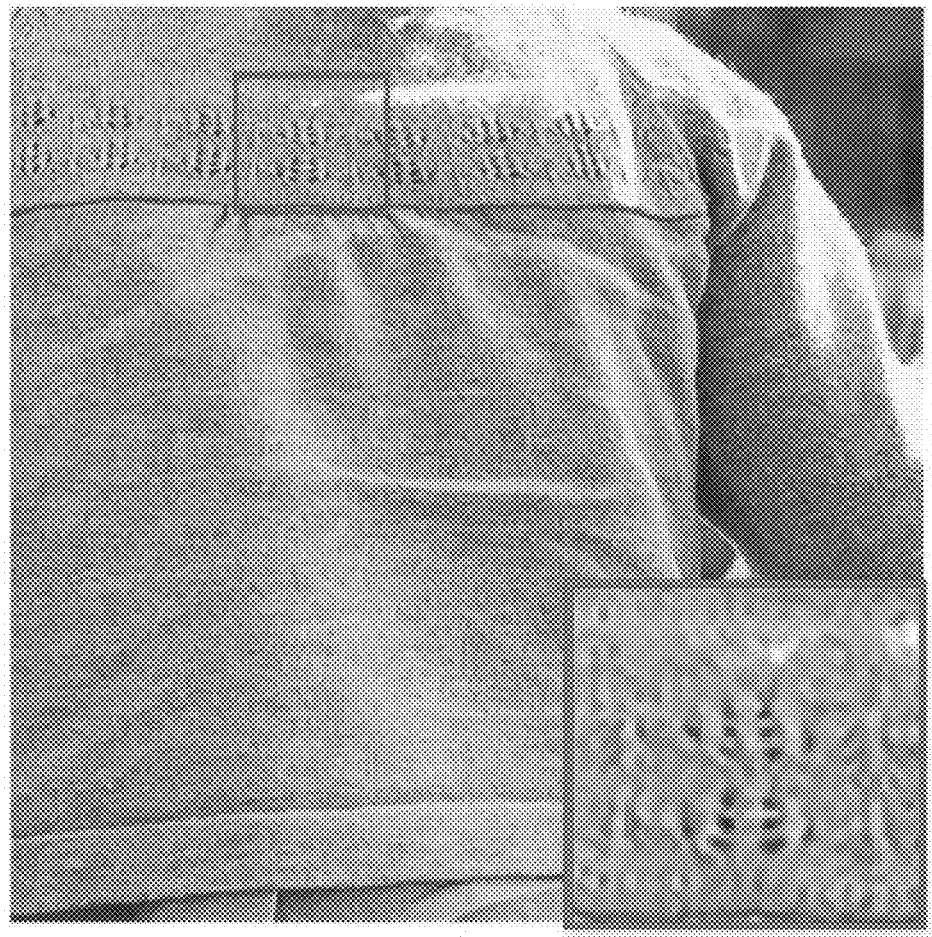
FIG. 12f is another example of an image processed through an FSRCNN-s method.

FIG. 12d is another example of an image processed through an SRCNN-Ex method. FIG. 12e is another example of an image processed through an FSRCNN method. FIG. 12f is another example of an image processed through an FSRCNN-s method.

Figure 12G:
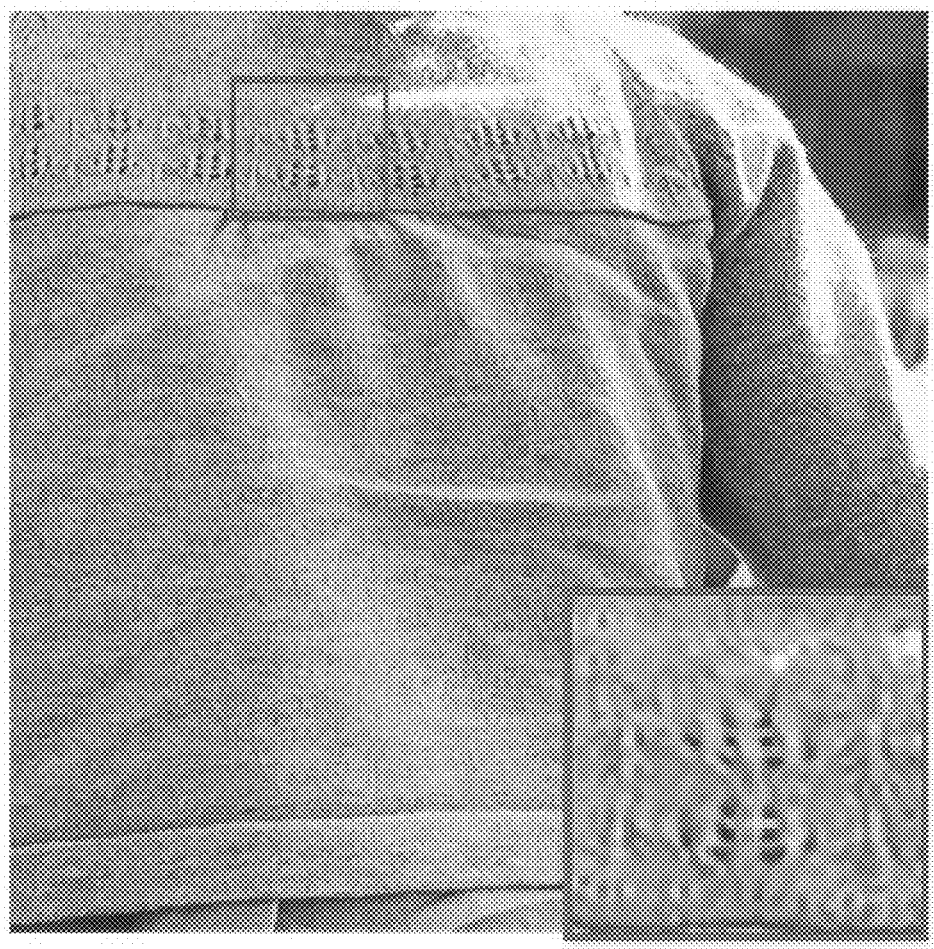
FIG. 12g is another example of an image processed through a VDSR method.
Figure 12H:
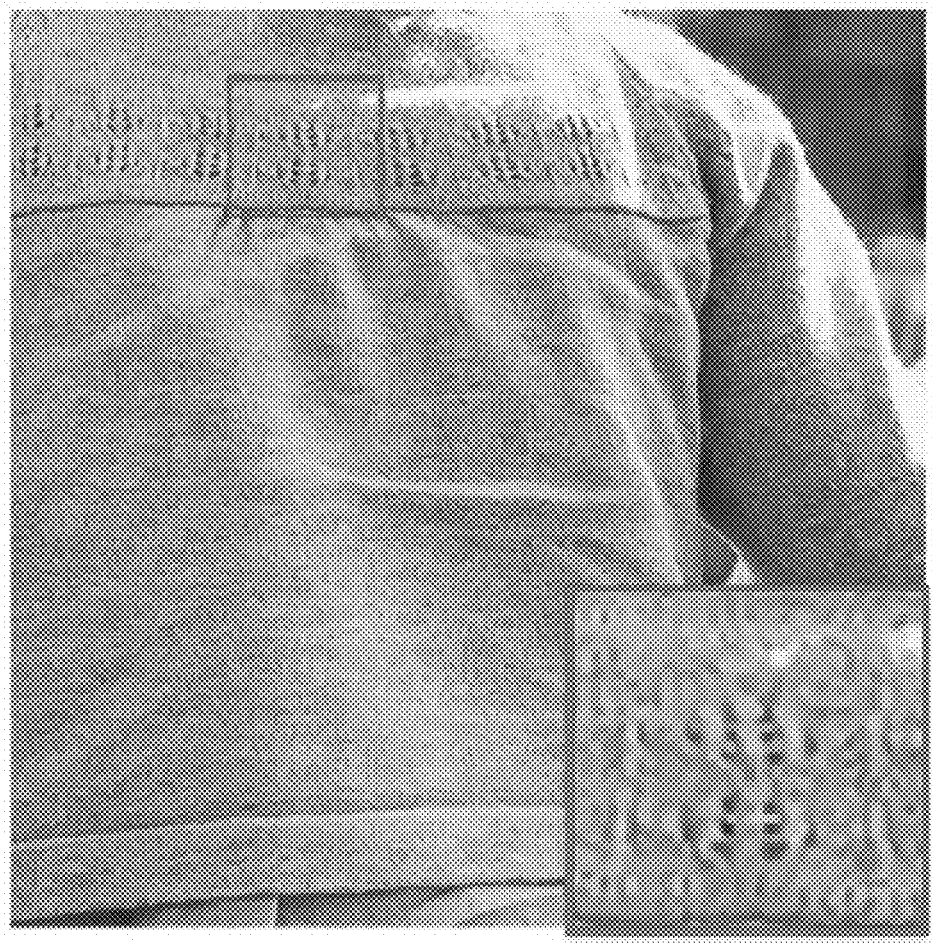
FIG. 12h is another example of an image processed by the image processing device illustrated in FIG. 1 using a quantized weight.

FIG. 12g is another example of an image processed through a VDSR method. FIG. 12h is another example of an image processed by the image processing device illustrated in FIG. 1 using a quantized weight.

Figure 12I:
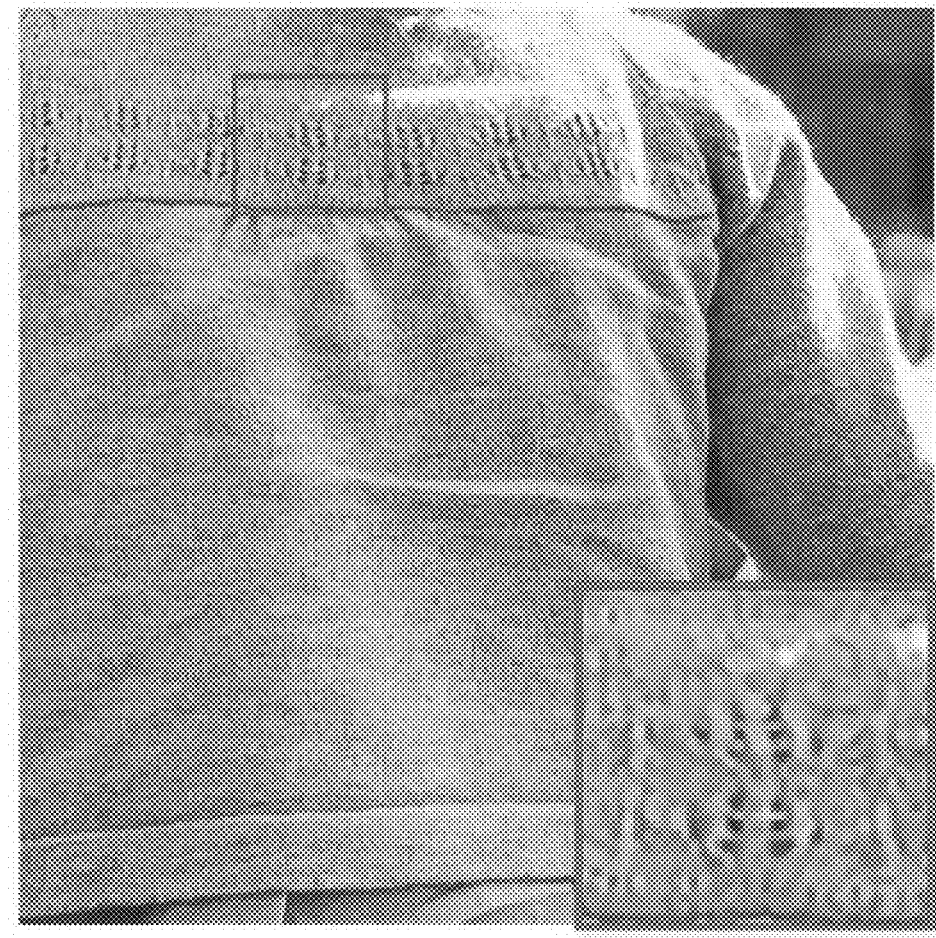
FIG. 12i is another example of an image processed by the image processing device illustrated in FIG. 1 using a quantized weight and activation.
Figure 12J:
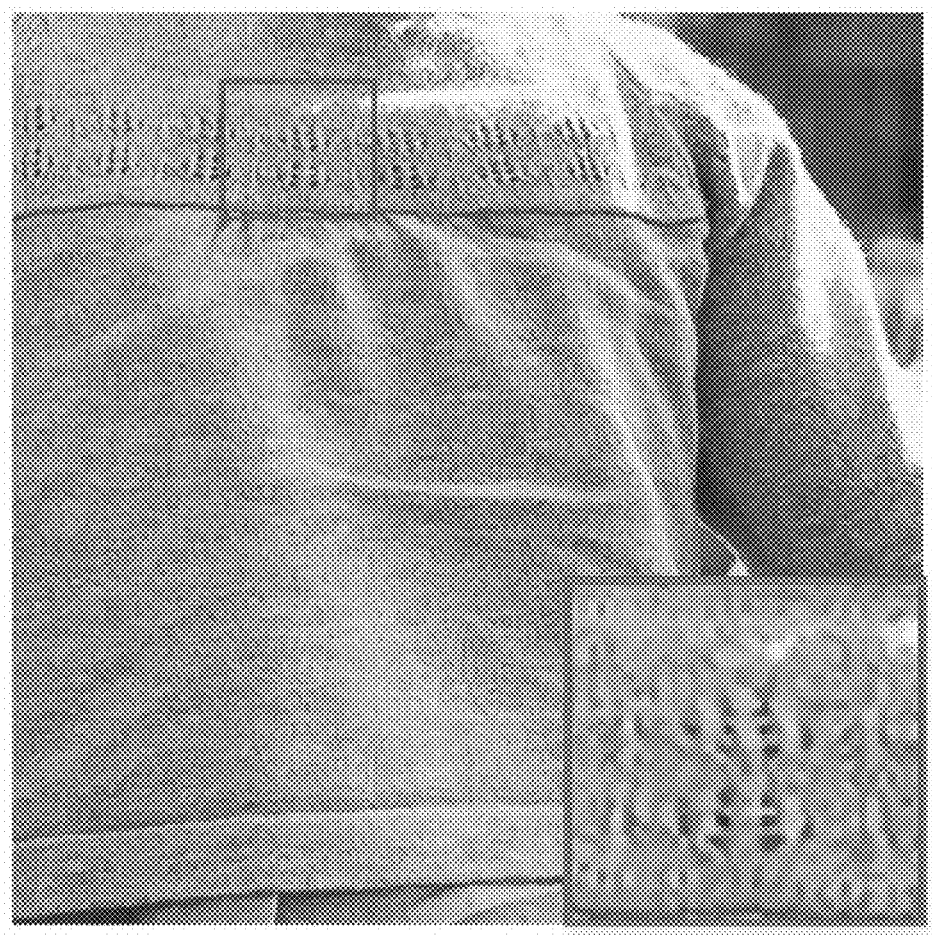
FIG. 12j is another example of an image processed by the image processing device illustrated in FIG. 1 using a quantized weight and activation, and compression of an intermediate feature map.

FIG. 12i is another example of an image processed by the image processing device illustrated in FIG. 1 using a quantized weight and activation. FIG. 12j is another example of an image processed by an image processing device illustrated in FIG. 1 using a quantized weight and activation, and compression of an intermediate feature map.

Referring to FIGS. 11a through 12j, performance of the image processing device 10 is compared to a bicubic method and other CNN-based SR methods including SRCNN, SRCNN-Ex, FSRCNN, and FSRCNN-s based methods. A MATLAB™ source code which is publicly usable for SRCNN, SRCNN-Ex, FSRCNN, and FSRCNN-s may be used, and the image processing device 10 may be implemented using PyTorch.

For a fair comparison, boundaries of a reconstructed HR image and an original image may be excluded from PSNR and SSIM calculations. All the methods may be performed on a CPU platform.

An open code of the VDSR is executable only on a GPU platform, and thus a third-party code executed on the CPU platform may be used to measure PSNR and SSIM and a runtime.

A runtime of the image processing device 10 may be measured based on software implementation using PyTorch.

Table 4 illustrates mean PSNR and SSIM values of the SR method that are compared to four benchmark datasets.

TABLE 4

| Methods | Bicubic | | SRCNN | | SRCNN-Ex | | FSRCNN | | FSRCNN-s | | VDSR | |
|---|---|---|---|---|---|---|---|---|---|---|---|---|
| Number of parameters | — | | 8K | | 57K | | 12K | | 4K | | 665K | |
| Weight bit | — | | 32-bit | | 32-bit | | 32-bit | | 32-bit | | 32-bit | |
| Activation bit | — | | 32-bit | | 32-bit | | 32-bit | | 32-bit | | 32-bit | |
| Dataset | PSNR | SSIM | PSNR | SSIM | PSNR | SSIM | PSNR | SSIM | PSNR | SSIM | PSNR | SSIM |
| Set-5 | 33.66 | 0.9299 | 36.34 | 0.9521 | 36.66 | 0.9542 | 37.00 | 0.9557 | 36.57 | 0.9531 | 37.53 | 0.9587 |
| Set-14 | 30.24 | 0.8688 | 32.18 | 0.9039 | 32.42 | 0.9063 | 32.63 | 0.9086 | 32.28 | 0.9049 | 33.03 | 0.9124 |
| B100 | 29.56 | 0.8431 | 31.11 | 0.8835 | 31.36 | 0.8870 | 31.50 | 0.8909 | 31.23 | 0.8866 | 31.90 | 0.8960 |
| Urban100 | 26.88 | 0.8403 | 29.09 | 0.8897 | 29.50 | 0.8946 | 29.85 | 0.9010 | 29.23 | 0.8914 | 30.76 | 0.9140 |

| Methods | Image processing apparatus (baseline) | Image processing apparatus (W) | Image processing apparatus Type-1 (W + A) | Image processing apparatus Type-2 (W + A) |
|---|---|---|---|---|
| Number of parameters | | 2.56K | | |
| Weight bit | 32-bit | 10-bit | 10-bit | 10-bit |
| Activation bit | 32-bit | 32-bit | 14-bit | 14-bit |

TABLE 4-continued

| Dataset | PSNR | SSIM | PSNR | SSIM | PSNR | SSIM | PSNR | SSIM |
|---|---|---|---|---|---|---|---|---|
| Set-5 | 36.66 | 0.9548 | 36.64 | 0.9544 | 36.64 | 0.9543 | 36.51 | 0.9520 |
| Set-14 | 32.52 | 0.9073 | 32.52 | 0.9071 | 32.47 | 0.9070 | 32.46 | 0.9055 |
| B100 | 31.32 | 0.8880 | 31.31 | 0.8876 | 31.31 | 0.8877 | 31.27 | 0.8864 |
| Urban100 | 29.34 | 0.8943 | 29.33 | 0.8942 | 29.32 | 0.8939 | 29.28 | 0.8916 |

Referring to Table 4 above, it is verified that the image processing device 10 has a greater level of performance compared to the FSRCNN-s, and occupies the number of filter parameters which is only 64% of that of the FSRCNN-s. In addition, it is verified that there is no performance degradation of the image processing device 10 even after quantization of weight parameter values and activations.

Although there is a performance degradation of approximately 0.1 dB in PSNR when applying feature map compression to a network of the image processing device 10, a required space of line memories may be reduced by a factor of approximately 2.58 times.

Table 5 illustrates a result of comparing the image processing device 10 and another CNN-based SR method in terms of an average computation time of PSNR and SSIM of test set-2 including a 4K UHD test image.

TABLE 5

| Methods | Bicubic | | SRCNN | | SRCNN-Ex | | FSRCNN | | FSRCNN-s | |
|---|---|---|---|---|---|---|---|---|---|---|
| HW implementation | FPGA, ASIC | | N/A | | N/A | | N/A | | N/A | |
| | | | CPU | GPU | CPU | GPU | CPU | GPU | CPU | GPU |
| Average time (sec) computation | — | | 277.6 | 1.052 | 288.0 | 1.256 | 324.4 | 0.583 | 146.4 | 0.518 |
| Image | PSNR | SSIM | PSNR | SSIM | PSNR | SSIM | PSNR | SSIM | PSNR | SSIM |
| Balloon | 33.79 | 0.9409 | 35.37 | 0.9582 | 35.55 | 0.9594 | 35.74 | 0.9607 | 35.47 | 0.9591 |
| Children | 33.56 | 0.9123 | 34.91 | 0.9272 | 34.97 | 0.9280 | 35.09 | 0.9291 | 34.92 | 0.9275 |
| Constance | 31.98 | 0.9271 | 32.84 | 0.9436 | 32.94 | 0.9447 | 33.01 | 0.9460 | 32.88 | 0.9439 |
| Lake | 30.1 | 0.8527 | 31.47 | 0.9004 | 31.68 | 0.9033 | 31.74 | 0.9047 | 31.58 | 0.9019 |
| Louvre | 35.63 | 0.9476 | 38.2 | 0.9666 | 38.39 | 0.9677 | 38.93 | 0.9699 | 38.35 | 0.9673 |
| Medieval | 29.68 | 0.9128 | 31.49 | 0.9424 | 31.76 | 0.9453 | 31.88 | 0.9464 | 31.60 | 0.9431 |
| High-rise building | 29.48 | 0.9103 | 32.23 | 0.9434 | 32.75 | 0.9470 | 33.04 | 0.9488 | 32.67 | 0.9458 |
| Supercar | 29.63 | 0.9453 | 32.22 | 0.9668 | 32.81 | 0.9699 | 33.00 | 0.9703 | 32.55 | 0.9679 |
| Average | 31.74 | 0.9199 | 33.59 | 0.9436 | 33.86 | 0.9457 | 34.05 | 0.9470 | 33.75 | 0.9446 |

| Methods | VDSR | | Image processing apparatus (baseline) | | Image processing apparatus (W) | | Image processing apparatus Type-1 (W + A) | | Image processing apparatus Type-2 (W + A) | |
|---|---|---|---|---|---|---|---|---|---|---|
| HW implementation | N/A | | N/A | | N/A | | FPGA | | | |
| | CPU | GPU | CPU | GPU | CPU | GPU | | | | |
| Average time (sec) computation | 124.3 | 2.851 | 2.53 | 0.050 | 2.62 | 0.057 | 0.0166 (60 fps) | | | |
| Image | PSNR | SSIM | PSNR | SSIM | PSNR | SSIM | PSNR | SSIM | PSNR | SSIM |
| Balloon | 35.99 | 0.9608 | 35.59 | 0.9601 | 35.589 | 0.9599 | 35.587 | 0.9599 | 35.550 | 0.9589 |
| Children | 35.28 | 0.9296 | 35.00 | 0.9288 | 34.997 | 0.9283 | 34.995 | 0.9283 | 34.947 | 0.9265 |
| Constance | 33.22 | 0.9470 | 32.93 | 0.9449 | 32.926 | 0.9446 | 32.924 | 0.9445 | 32.911 | 0.9440 |
| Lake | 31.87 | 0.9057 | 31.57 | 0.9019 | 31.565 | 0.9016 | 31.561 | 0.9015 | 31.532 | 0.9006 |
| Louvre | 39.36 | 0.9708 | 38.33 | 0.9680 | 38.320 | 0.9677 | 38.312 | 0.9676 | 38.234 | 0.9668 |
| Medieval | 32.17 | 0.9482 | 31.61 | 0.9443 | 31.598 | 0.9437 | 31.596 | 0.9437 | 31.561 | 0.9427 |
| High-rise building | 33.16 | 0.9496 | 32.57 | 0.9462 | 32.562 | 0.9458 | 32.550 | 0.9457 | 32.479 | 0.9439 |
| Supercar | 33.20 | 0.9705 | 32.38 | 0.9681 | 32.370 | 0.9677 | 32.362 | 0.9676 | 32.308 | 0.9658 |
| Average | 34.28 | 0.9477 | 33.75 | 0.9453 | 33.740 | 0.9449 | 33.736 | 0.9448 | 33.690 | 0.9437 |

It is verified that the image processing device 10 may reconstruct an HR image of a quality that equals to that obtained using the other SR methods. Regarding a runtime, a relatively longer runtime may be used because open codes of the SRCNN, the SRCNN-Ex, the FSRCNN, and the FSRCNN-s are implemented in MATLAB and may not be optimized on a CPU platform.

For a fair comparison, a network used by the image processing device 10 may also be implemented in Tensor-Flow, and other codes may be written in TensorFlow and a runtime may be measured in a GPU platform.

Referring to Table 5 above, runtimes measured by a GPU for various CNN-based SR methods including the image processing device 10 are verified. A runtime of the image processing device 10 run in the GPU is measured as approximately 50 ms, which may be faster about three times compared to FPGA implementation.

FIGS. 11*a* through 11*j* are images reconstructed using five CNN-based SR methods including a bicubic method and the image processing device 10, and cropped regions thereof. It is verified that, although the image processing device 10 uses the least number of parameters, a result HR image has a sharp edge and well-recognizable with less artifacts.

FIGS. 12*a* through 12*j* are cropped regions of an HR image reconstructed from a 4K UHD resolution image of a child. It is verified that a visual quality obtained by the image processing device 10 and those obtained by other CNN-based SR methods are similar.

Figure 13:
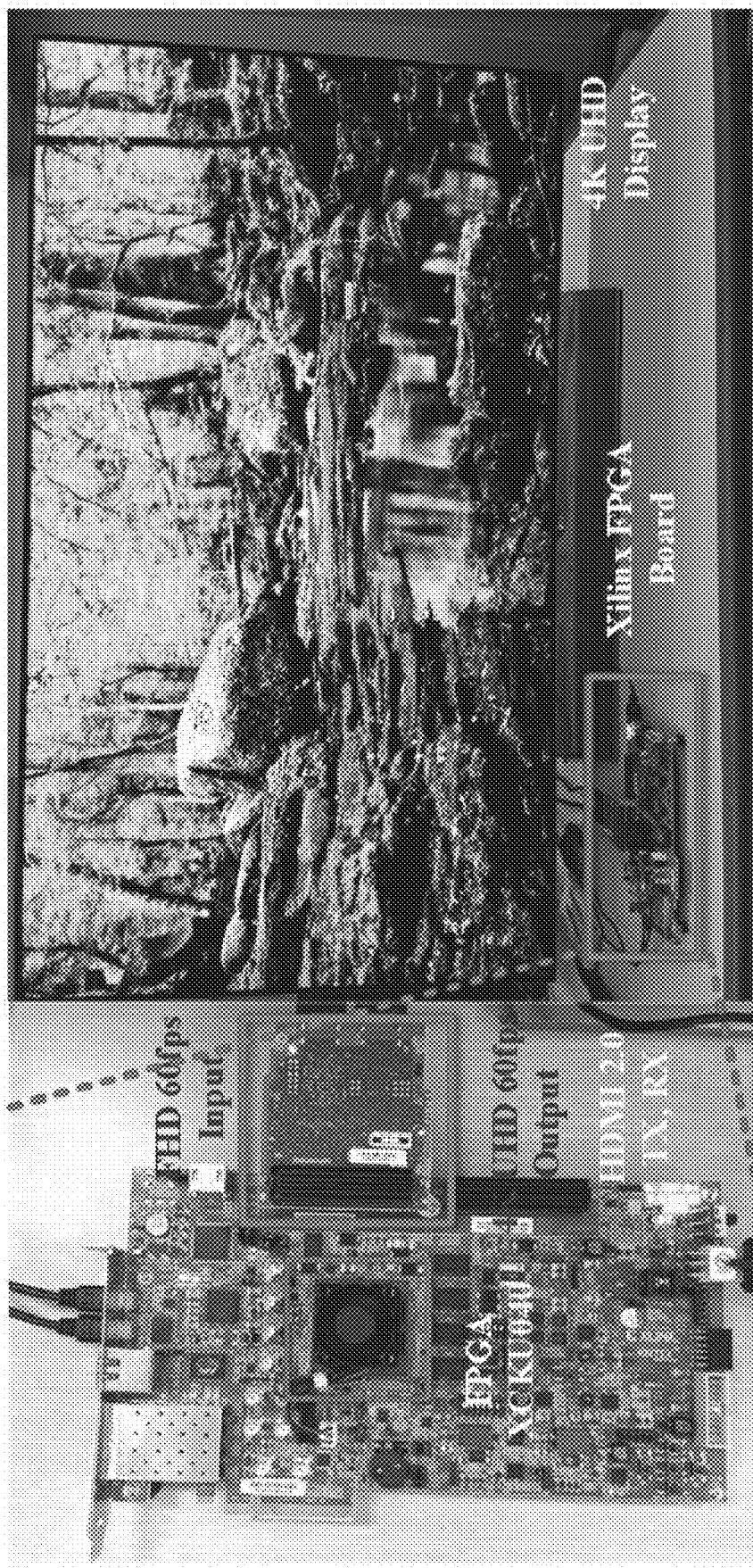
FIG. 13 illustrates an example of an implementation of super-resolution (SR) hardware by a field programmable gate array (FPGA).

FIG. 13 illustrates an example of an implementation of SR hardware by an FPGA.

Referring to FIG. 13, a prototype of the image processing device 10 implemented on an FPGA is verified. Table 6 illustrates details of implementation of methods by Lee and Yang, and super-interpolation (SI), and the implementation of the image processing device 10.

high-frequency patch using a dictionary based on anchored neighborhood regression (ANR), and obtain an FHD at 60 fps.

A machine learning-based SI HW architecture may be based on linear mapping using an edge direction analysis that directly reconstructs an HR image through a high-frequency restoration without requiring an intermediate image.

The image processing device 10 may be implemented using SystemVerilog of the FPGA. An output clock speed of the image processing device 10 may be four times greater than an input clock speed thereof. This may be because an FHD (over 4K UHD) operating frequency ratio is generally ¼.

The image processing device 10 may process four pixels per clock cycle and support a 4K UHD video stream at 60 fps, and be implemented based on a restrictive condition applied to a stage of incorporating a 150 MHz target operating frequency and Vivado Design Suite (2015.4) and to a stage of placing and routing (P&R).

In addition, Xilinx Kintex UltraScale FPGA KCU105 evaluation board and TED's HDMI 2.0 expansion card may be used to support an FHD input and a 4K UHD output video interface to verify the implemented SR hardware.

Two types of SR HW may be provided to the image processing device 10. The two types may include Type-1 to which feature map compression is not applied, and Type-2 to which the feature map compression is applied.

In Type-1, a 110K slice LUT and a 102K slice register that occupy 45.38% of all slice LUTs and 21.08% of all slice registers in a XCKU040 FPGA device may be used.

In Type-2, a 151K slice LUT and a 121K slice register that occupy 62.6% of all the slice LUTs and 24.97% of all the slice registers may be used.

TABLE 6

| Theses | Lee | Yang | Kim | | Image processing apparatus | |
|---|---|---|---|---|---|---|
| Methods | Sharp Filter Lagrange | ANR | Edge Orientation Learn Linear Mappings | | CNN Type-1 HW: No compression | Type-2 HW: Compression |
| FPGA device or CMOS technology | 0.13 μm | Altera EP4SGX530 90 nm | Xilinx XCKU040 | 0.13 μm | Xilinx XCKU040 | |
| FPGA resource or equivalence gate count* | 5.1K | N/A 1,985K | Slice LUTs: 3,395 Slice Regs: 1,952 DSP Blocks: 108 | 159K | Slice LUTs: 110K Slice Regs: 102K DSP Blocks: 1920 | Slice LUTs: 151K Slice Regs: 121K DSP Blocks: 1920 |
| Line buffer | 4 (input) | 5 (input), 24 (internal) 8 (output) | 2 (input) 4 (output) | | 4 (input), 96 (internal), 4 (output) | |
| Memory size (Bytes) | N/A | 235K | 92K | | 392K | |
| Max frequency (MHz) | 431 | 124.4 | 150 | 220 | 150 | |
| Throughput (Mpixels/s) | 431 | 124.4 | 600 | 880 | 600 | |
| Supported scale | 2X, 3X | 2X | 2X | | 2X | |
| PSNR Set5 | N/A | 33.83 | 34.78 | | 36.64 | |
| (dB) Set14 | N/A | 29.77 | 31.63 | | 32.47 | |
| Target resolution | 4K UHD (30 fps) | FHD (60 fps) | 4K UHD (60 fps) | | 4K UHD (60 fps) | |

*2 input NAND gates are counted as a single equivalence gate.

Lee et al. proposed hardware using a Lagrange interpolation method using a sharpening algorithm that may obtain a 4K UHD video stream from an HD and FHD stream at 30 fps.

An HW architecture proposed by Yang may require an intermediate image of a target resolution to generate a In addition, both Type-1 and Type-2 may maximally use a 1,920 DSP block in the XCKU040 FPGA device of the KCU105 evaluation board.

Type-2 may reduce on-chip memory usage, for example, block RAM in the FPGA, by approximately 50% of that of Type-1. Type-2 may further use approximately 38% of the slice LUTs and approximately 18% of the slice registers to implement two compressors 230 and six decompressors 250, compared to Type-1.

Although the image processing device 10 may require a greater number of line memories and gates compared to a non-CNN-based SR method, it may reconstruct a 4K UHD HR image of a considerably higher quality in real time at a speed of 60 fps.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processor.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An image processing device comprising:
    a receiver configured to receive an image;
    a first convolution operator configured to generate a feature map by performing a convolution operation based on the image;
    a compressor configured to compress the feature map into at least one line-wise feature map; and
    a decompressor configured to reconstruct the compressed line-wise feature map.

2. The image processing device of claim 1, further comprising:
    at least one first line buffer configured to output the image as a line-wise image line.

3. The image processing device of claim 1, further comprising:
    at least one second line buffer configured to store the compressed line-wise feature map.

4. The image processing device of claim 1, wherein the first convolution operator is implemented in a residual block that learns a residual signal and outputs the learned residual signal.

5. The image processing device of claim 1, wherein the first convolution operator comprises:
    at least one one-dimensional (1D) convolution operator configured to perform an 1D convolution operation.

6. The image processing device of claim 1, wherein the first convolution operator comprises:
    a depth-wise convolution operator; and
    a point-wise convolution operator connected directly to the depth-wise convolution operator.

7. The image processing device of claim 1, wherein the compressor is configured to compress the feature map in at least one direction of a width direction, a height direction, or a depth direction of the feature map.

8. The image processing device of claim 1, further comprising:
    a second convolution operator configured to perform a convolution operation based on the reconstructed compressed feature map.

9. The image processing device of claim 8, wherein the second convolution operator comprises:
    at least one two-dimensional (2D) convolution operator configured to perform a 2D convolution operation.

10. The image processing device of claim 8, wherein the second convolution operator comprises:
    a depth-wise convolution operator; and
    a point-wise convolution operator connected directly to the depth-wise convolution operator.

11. The image processing device of claim 1, further comprising:
    a quantizer configured to quantize a result of at least one convolution operation.

12. The image processing device of claim 1, further comprising:
    a weight buffer configured to store a parameter used for a convolution operation.

13. An image processing method comprising:
    receiving an image;
    generating a feature map by performing a first convolution operation based on the image;
    compressing the feature map into at least one line-wise feature map; and
    reconstructing the compressed line-wise feature map.

14. The image processing method of claim 13, further comprising:
   outputting the image as at least one line-wise image line.

15. The image processing method of claim 13, further comprising:
   storing the compressed line-wise feature map.

16. The image processing method of claim 13, wherein the first convolution operation is performed in a residual block that learns a residual signal and outputs the learned residual signal.

17. The image processing method of claim 13, wherein the generating comprises:
   performing at least one one-dimensional (1D) convolution operation.

18. The image processing method of claim 13, wherein the generating comprises:
   performing a depth-wise convolution operation; and
   performing a point-wise convolution operation directly on a result of the depth-wise convolution operation.

19. The image processing method of claim 13, wherein the compressing comprises:
   compressing the feature map in at least one direction of a width direction, a height direction, or a depth direction of the feature map.

20. The image processing method of claim 13, further comprising:
   performing a second convolution operation based on the reconstructed compressed feature map.

\* \* \* \* \*